United States Patent
Nagata et al.

(10) Patent No.: US 11,295,100 B2
(45) Date of Patent: Apr. 5, 2022

(54) OPTICAL READING DEVICE

(71) Applicant: Keyence Corporation, Osaka (JP)

(72) Inventors: Hidezumi Nagata, Osaka (JP);
Kazuteru Yamamura, Osaka (JP)

(73) Assignee: KEYENCE CORPORATION, Osaka (JP)

(*) Notice: Subject to any disclaimer, the term of this patent is extended or adjusted under 35 U.S.C. 154(b) by 0 days.

(21) Appl. No.: 17/180,895

(22) Filed: Feb. 22, 2021

(65) Prior Publication Data

US 2021/0294994 A1  Sep. 23, 2021

(30) Foreign Application Priority Data

Mar. 19, 2020 (JP) .............................. JP2020-049422

(51) Int. Cl.
*G06K 7/10* (2006.01)
*G06K 7/14* (2006.01)

(52) U.S. Cl.
CPC ..... *G06K 7/10574* (2013.01); *G06K 7/10722* (2013.01); *G06K 7/1413* (2013.01); *G06K 7/1417* (2013.01)

(58) Field of Classification Search
CPC ........... G06K 7/10574; G06K 7/10722; G06K 7/1413; G06K 7/1417
USPC ........................................................ 235/454
See application file for complete search history.

(56) References Cited

U.S. PATENT DOCUMENTS 8,172,143 B2  5/2012  Matsuda et al.
2014/0098220 A1* 4/2014  Nunnink .......... H04N 5/232121
                                                    348/135

FOREIGN PATENT DOCUMENTS

JP  201264178 A  3/2012
JP  2018136860 A  8/2018

OTHER PUBLICATIONS

U.S. Appl. No. 17/180,896, filed Feb. 22, 2021 (89 pages).
U.S. Appl. No. 17/180,899, filed Feb. 22, 2021 (99 pages).
U.S. Appl. No. 17/180,901, filed Feb. 22, 2021 (83 pages).

* cited by examiner

*Primary Examiner* — Toan C Ly
(74) *Attorney, Agent, or Firm* — Kilyk & Bowersox, P.L.L.C.

(57) ABSTRACT

A sufficient decoding processing time for each image acquired by performing high-speed imaging is secured to obtain a stable reading result, thereby enabling immediate output of the obtained reading result. A processing unit has a first core and a plurality of second cores. The first core instructs the second cores, presumed to be capable of immediately executing the decoding process or executing the decoding process next to a decoding process being currently executed, to execute the decoding process. The second cores are configured to be capable of simultaneously executing the decoding process on read images instructed by the first core at different timings.

9 Claims, 25 Drawing Sheets

FIG. 8

| READING | BANK | COMMUNICATION | ... | | |
|---|---|---|---|---|---|
| | SETTING ITEM | | | BANK 1 | BANK 2 |
| | BANK NAME | | | FOR BAR CODE | FOR 2D CODE |
| COMMON | DECODING TIMEOUT VALUE | | | 50ms | 50ms |
| | BLACK AND WHITE INVERSION | | | VALID | VALID |
| | INTERNAL VERIFICATION | | | VALID | VALID |
| | EXTERNAL LIGHTING | | | INVALID | INVALID |
| | DETAILED CODE SETTINGS | | | CODE128 | QR |
| | ... | | | | |
| READING | EXPOSURE TIME | | | 100 μs | 120 μs |
| | GAIN | | | 15 | 20 |
| | CONTRAST ADJUSTMENT SCHEME | | | HDR1 | HDR2 |
| | FIRST IMAGE FILTER | | | LEVELING FILTER | INVALID |
| | SECOND IMAGE FILTER | | | INVALID | INVALID |
| | ... | | | | |

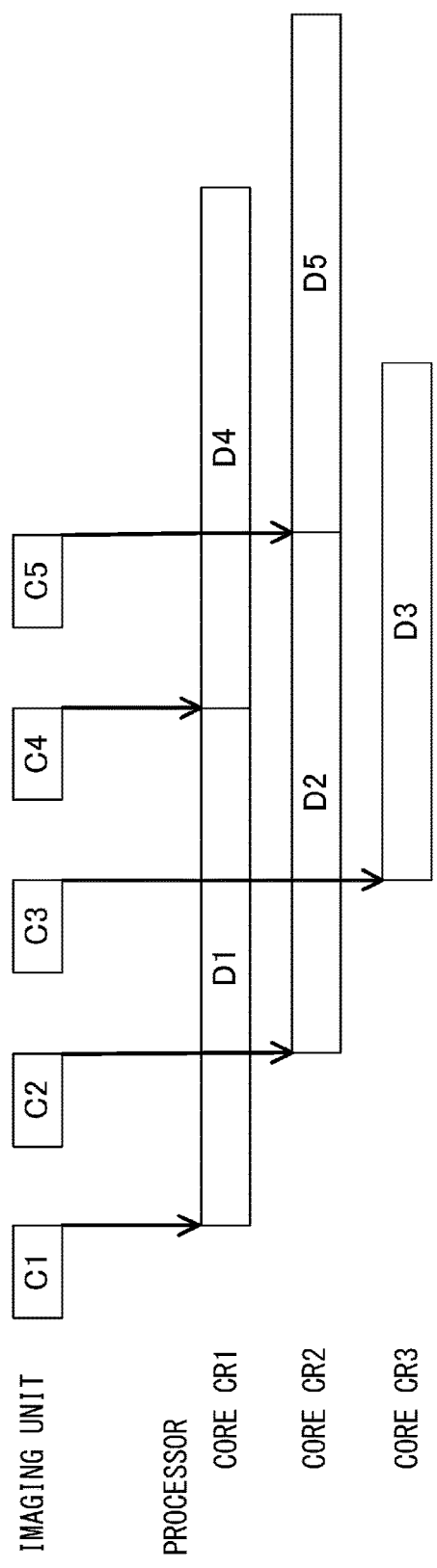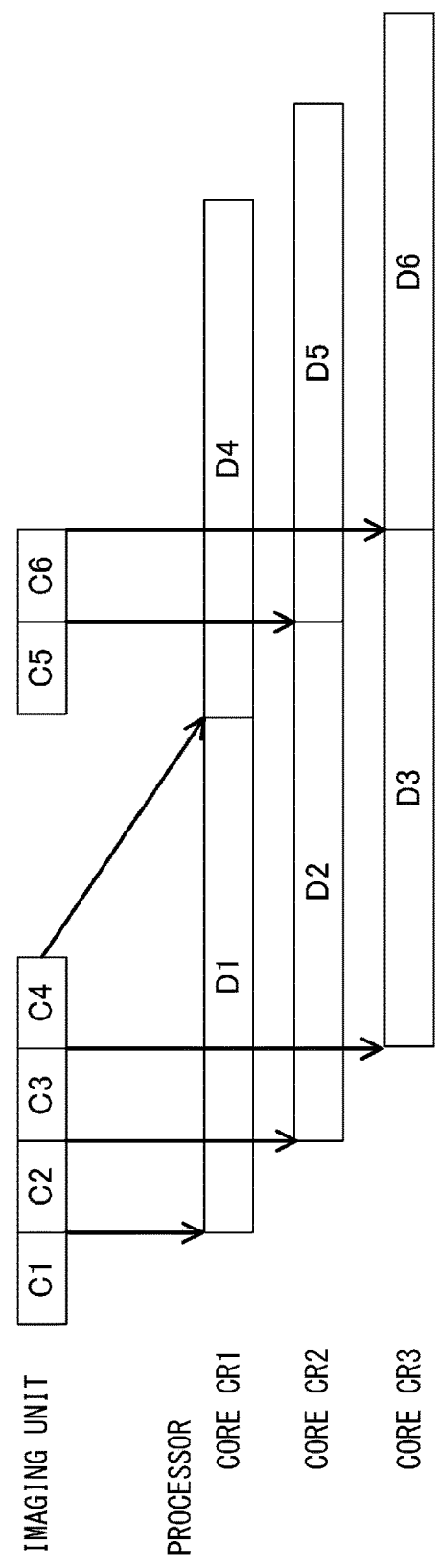

OPTICAL READING DEVICE

CROSS-REFERENCE TO RELATED APPLICATIONS

The present application claims foreign priority based on Japanese Patent Application No. 2020-049422, filed Mar. 19, 2020, the contents of which are incorporated herein by reference.

BACKGROUND OF THE INVENTION

1. Field of the Invention

The present aspect relates to an optical reading device that reads information included in a read image generated by capturing an image of a workpiece.

2. Description of Related Art

In general, a code reader configured to be capable of capturing an image of a code, such as a bar code and a two-dimensional code, attached to a workpiece with a camera, cutting and binarizing the code included in the obtained image by image processing, and reading information by a decoding process (see, for example, Japanese Patent Laid-Open No. 2018-136860 and Japanese Patent Laid-Open No. 2012-64178).

An optical reading device in Japanese Patent Laid-Open No. 2018-136860 is configured to set an upper limit of an exposure time for reading a code based on a moving speed of a workpiece and a cell size constituting the code, and acquire and analyze a plurality of images including the code to automatically set the exposure time within the upper limit.

An optical reading device of Japanese Patent Laid-Open No. 2012-64178 includes a first core that causes an imaging unit to execute imaging processing and transfers acquired image data to a shared memory and a second core that reads the image data from the shared memory and executes a decoding process based on a decoding process request from the first core.

Meanwhile, in the optical reading device of Japanese Patent Laid-Open No. 2012-64178, the processing speed is increased by providing the first core that executes the imaging processing and the second core that executes the decoding process.

However, assuming a case where an optical reading device is used in a distribution center, for example, it is required to immediately sort workpieces flowing at high speed, and thus, it is required to reduce the occurrence frequency of reading errors while achieving even higher speed from imaging to output of a reading result, and a technical difficulty for achieving both of these conflicting requirements is extremely high.

That is, for example, in the distribution center, conveyed objects (workpieces) having various sizes and shapes are conveyed at high speed, and it is difficult to capture an image timely. Therefore, when the conveyed object passes through an imaging area, there is a case where a plurality of times of imaging (burst imaging) is premised instead of single imaging. However, the conveyed objects continue to move during imaging, and thus, the conveyed object flows until a decoding result is output if the time required for one decoding process is long so that the plurality of times of imaging becomes meaningless. Accordingly, it is necessary to execute the decoding process at high speed.

In addition, the code attached to the conveyed object in the distribution center sometimes deteriorates in quality by being rubbed, strained, or torn during conveyance, and there is also a problem that reading tends to be unstable due to low contrast. Therefore, it is difficult to perform stable reading unless a sufficient decoding processing time is secured.

Further, the conveyed objects are conveyed at high speed one after another in the distribution center, and thus, there is a problem that it is difficult to determine whether a reading result is a reading result of a code attached to an imaged conveyed object or a reading result of a code attached to a conveyed object that has been subsequently conveyed if it takes a long time from imaging to output of reading results after the decoding process. Therefore, it is desirable that the reading result be output immediately after imaging.

In other words, it is required to meet three conditions, which are contrary to each other, of acquisition of a plurality of images by high-speed imaging, securement of a sufficient decoding processing time for each acquired image, and immediate output of reading results. This is a problem that is not limited to the distribution center, but is also a problem that is likely to occur in facilities and factories that convey various workpieces.

The present aspect has been made in view of this point, and an object thereof is to secure a sufficient decoding processing time for each image acquired by performing high-speed imaging, obtain a stable decoding result, and enable immediate output of the obtained decoding result.

SUMMARY OF THE INVENTION

In order to achieve the above object, the present disclosure is intended for a stationary optical reading device that reads a code attached to a workpiece being conveyed on a line. The optical reading device includes: an illumination unit configured to emit light toward an area through which a workpiece passes; an imaging unit configured to receive the light emitted from the illumination unit and reflected from the area through which the workpiece passes and to generate a read image obtained by capturing an image of the area through which the workpiece passes; a processing unit including a first core that instructs a decoding process of the read image generated by the imaging unit and a plurality of second cores that acquire the read image instructed by the first core and execute a decoding process on the acquired read image; and an output unit that outputs decoding results generated by the plurality of second cores. The first core instructs the second core, which is presumed to be capable of immediately executing the decoding process or executing the decoding process next to a decoding process being currently executed, to execute the decoding process. The plurality of second cores can simultaneously execute the decoding processes on the read images instructed by the first core at different timings.

Accordingly, when the workpiece conveyed on the line is irradiated with light from the illumination unit, the light reflected on the workpiece is received by the imaging unit, and the read image including the workpiece and the code attached to the workpiece is generated. It is possible to capture images of one workpiece being conveyed a plurality of times to generate a plurality of read images.

When a plurality of read images, such as a first read image, a second read image, a third read image, and so on are generated, the first core can instruct a second core to execute a decoding process of the first read image. Further, the first core instructs another second core that can immediately execute the decoding process to execute a decoding process of the second read image. Then, these second cores simultaneously execute the decoding processes on the instructed first and second read images. Note that the first core may execute the decoding process.

In addition, the first core instructs a second core, presumed to be capable of executing a decoding process next to a decoding process being currently executed, to execute a decoding process of the third read image when the plurality of second cores are executing the decoding processes, and thus, the decoding process of the third read image is immediately executed as soon as the decoding processes being currently executed are completed. As a result, it is possible to execute the decoding processes of the plurality of read images at the same time.

In addition, the second core that is presumed to be capable of immediately executing the decoding process may be a second core that is not currently executing a decoding process. In this case, the first core can instruct the second core, which is not currently executing the decoding process, to execute the decoding process of the read image among the plurality of second cores. In addition, the second core, which is presumed to be capable of executing the decoding process next, may be a core derived according to a certain rule. For example, if the order for a plurality of second cores has been determined in advance, the decoding process may be instructed in the order of the first second core, the second core, the third second core, and so on, and the second core that can execute the decoding process next can be presumed based on the order of the second cores. In other words, it is sufficient to instruct the second core, which is presumed to be capable of executing the decoding process immediately or is presumed to be capable of executing the decoding process next, based on a certain presumption standard, and this presumption can be overturned as a result.

Therefore, the plurality of second cores can simultaneously execute the decoding processes on the read images instructed at different timings, and thus, the decoding process of the plurality of read images is speeded up while securing a sufficient decoding processing time for one read image and enabling stable reading. As a result, the reading result can be obtained at high speed, and the reading result can be output immediately after the generation of the read image. Note that the imaging unit may generate the read images at regular time intervals.

According to another embodiment of the invention, the imaging unit is configured to be capable of successively generating read images. The optical reading device includes a tuning execution unit that acquires a read image including a code from the imaging unit during setting, causes the processing unit to execute a decoding process on the acquired read image to measure a time required for the decoding process, and automatically sets an upper limit time of the decoding process based on the measured time.

According to this configuration, so-called infinite burst imaging can be executed by continuing the successive generation of the read images. As a result, the code of the workpiece moving at high speed can be captured in the read image without being missed.

In addition, since the tuning execution unit measures the time required for the decoding process and automatically sets the upper limit time of the decoding process based on the measured time, the upper limit time of the decoding process suitable for actual read image and code can be set. The upper limit time of the decoding process is a timeout time of the decoding process. When reaching the preset upper limit time during the operation of the optical reading device, for example, when the decoding process takes a long time such as a poor-quality code, the second core in middle of the decoding process terminates the decoding process.

According to still another embodiment of the invention, the upper limit time of the decoding process is set to be shorter than a reference time obtained by multiplying a time, obtained by adding a time for generating a read image by the imaging unit and a time required for the second core to read a read image stored in a memory by the first core, by the number of the second cores.

That is, after a read image is generated by the imaging unit, the first core stores the generated read image in the memory, and the decoding process by the second core is executed as the second core reads the stored read image. Since such processing is executed by all the second cores, it is possible to execute the decoding process on all of the generated read images by setting the upper limit time of a decoding process in one second core to be shorter than the time obtained by multiplying the time, obtained by adding the time for generating the read image and the time required for the second core to read the read image stored in the memory by the first core, by the number of the second cores.

According to still another embodiment of the invention, the tuning execution unit obtains a reference time, obtained by multiplying a time, obtained by adding a time for generating a read image by the imaging unit and a time required for the second core to read a read image stored in a memory by the first core, by the number of the second cores, compares the obtained reference time with the measured time, and sets the measured time as the upper limit time of the decoding process when the measured time is equal to or shorter than the reference time.

According to this configuration, the tuning execution unit causes the second core to execute the decoding process of the read image and automatically sets the upper limit time of the decoding process at the time of setting made before operating the optical reading device. The upper limit time of the decoding process varies depending on a type of code, a transfer speed of the workpiece, or the like, but the decoding process can be executed for all the read images generated by the infinite burst imaging by setting the upper limit time as described above.

According to still another embodiment of the invention, the tuning execution unit compares the reference time with the measured time, and sets the measured time as the upper limit time of the decoding process when the measured time exceeds the reference time.

For example, in the case of an obfuscated code, it takes time for the decoding process, which is sometimes longer than the above reference time. In this example, in such a case, the upper limit time of the decoding process can be increased regardless of the reference time, and thus, the decoding process is hardly interrupted in the middle.

According to still another embodiment of the invention, a fixed interval imaging mode of increasing a generation interval of the read image by the imaging unit as compared with a generation interval in a case where the measured time is equal to or shorter than the reference time is executed when the measured time is set as the upper limit time of the decoding process.

That is, when the upper limit time of the decoding process exceeds the above reference time, there is a read image that is not decodable even if the infinite burst imaging is performed. In this case, it is possible to eliminate the read image that is not decodable by executing the fixed interval imaging mode.

According to still another embodiment of the invention, the first core instructs the second cores, different from each other, to execute a decoding process of a first code and a second code when the read image includes the first code and the second code.

For example, there is a case where one read image includes the first code and the second code. In this case, the first code and the second code can be subjected to the decoding process in parallel, and the processing time for one read image can be shortened by instructing one second core to execute the decoding process of the first code and instructing the other second core to execute the decoding process of the second code.

According to still another embodiment of the invention, when types of the first code and the second code included in the read image are different, the first core instructs the second cores, different from each other, to execute the decoding processes of the first code and the second code.

For example, there is a case where one read image includes a one-dimensional code as the first code and a two-dimensional code as the second code. In this case, the different types of codes can be decoded in parallel, and the processing time for one read image can be shortened by instructing one second core to execute the decoding process of the one-dimensional code and instructing the other second core to execute the decoding process of the two-dimensional code. Note that both the first code and the second code may be one-dimensional codes, and may be different types of the one-dimensional codes. In addition, both the first code and the second code may be two-dimensional codes, and may be different types of the two-dimensional codes.

According to still another embodiment of the invention, each of the second cores can include: a first decoding processing unit configured to execute a decoding process of a one-dimensional code; and a second decoding processing unit configured to execute a decoding process of a two-dimensional code, and When the read image includes a one-dimensional code and a two-dimensional code, the second core can execute the decoding process of the one-dimensional code by the first decoding processing unit, and execute the decoding process of the two-dimensional code by the second decoding processing unit.

According to still another embodiment of the invention, the imaging unit can capture images of the workpiece under different imaging conditions to generate a first read image and a second read image, and the first core can instruct the second cores, different from each other, to execute a decoding process on the first read image and the second read image. As a result, the decoding process can be executed in parallel on the first read image and the second read image generated under the different imaging conditions, and thus, the decoding result can be output at higher speed.

According to still another embodiment of the invention, a storage unit, which stores a plurality of banks including imaging parameters that define the imaging conditions of the imaging unit, and a receiving unit, which receives selection of a first bank and a second bank performed by a user from among the plurality of banks stored in the storage unit, are provided, and the imaging unit generates the first read image according to an imaging parameter of the first bank received by the receiving unit, and generates the second read image according to an imaging parameter of the second bank received by the receiving unit.

Since the plurality of banks are stored in advance, an imaging parameter of a bank can be reflected in imaging performed by the imaging unit when a user selects the bank that is considered to be appropriate according to a type of code, a workpiece, or the like. For example, when a one-dimensional code and a two-dimensional code are attached to one workpiece and it is desired to apply different imaging parameters between the one-dimensional code and the two-dimensional code, it is possible to generate a first read image to which the imaging parameter of the first bank has been applied and a second read image to which the imaging parameter of the second bank has been applied by selecting the first bank suitable for the one-dimensional code and the second bank suitable for the two-dimensional code. As a result, the accuracy and speed of the decoding process of each read image are improved.

According to still another embodiment of the invention, the first core instructs the second cores to execute a decoding process on the first read image and the second read image under decoding conditions different from each other.

The decoding process can be executed in parallel on the first read image and the second read image under different decoding conditions.

According to still another embodiment of the invention, when instructing the second cores, different from each other, to decode a plurality of read images generated by capturing an image of a single workpiece and detecting completion of the decoding process in any one of the second cores out of the second cores instructed to execute the decoding process, the first core stops the decoding process of the other second core. Such stop processing is not essential, and each of the second cores may continue the decoding process if there is a margin in the processing of the second core.

That is, when each of the plurality of second cores executes the decoding process of each of read images, the timing at which the decoding process is completed is usually different. Since a decoding result is obtained when the decoding process is completed by any of the second cores, there is no point in continuing the decoding process by the other second core thereafter. In such a case, the decoding process of the other second core can be stopped.

As described above, according to the present disclosure, the first core can instruct the second cores, presumed to be capable of executing a decoding process immediately or executing a decoding process next to a decoding process being currently executed, to execute the decoding process, and the plurality of second cores can simultaneously execute the decoding processes on the read images instructed by the first core at different timings. As a result, it is possible to immediately output the obtained reading result while securing the sufficient decoding processing time for each image acquired by performing the high-speed imaging and obtaining the stable reading result.

BRIEF DESCRIPTION OF THE DRAWINGS

FIG. 8 is a view illustrating a display example of a parameter set;

FIG. 18 is a timing chart of a fixed interval imaging mode;

FIG. 19 is a timing chart in a case where imaging is not performed at fixed intervals;

DETAILED DESCRIPTION OF PREFERRED EMBODIMENTS

Hereinafter, an embodiment of the present aspect will be described in detail with reference to the drawings. Note that the following description of the preferred embodiment is merely an example in essence, and is not intended to limit the present aspect, its application, or its use.

Figure 1:
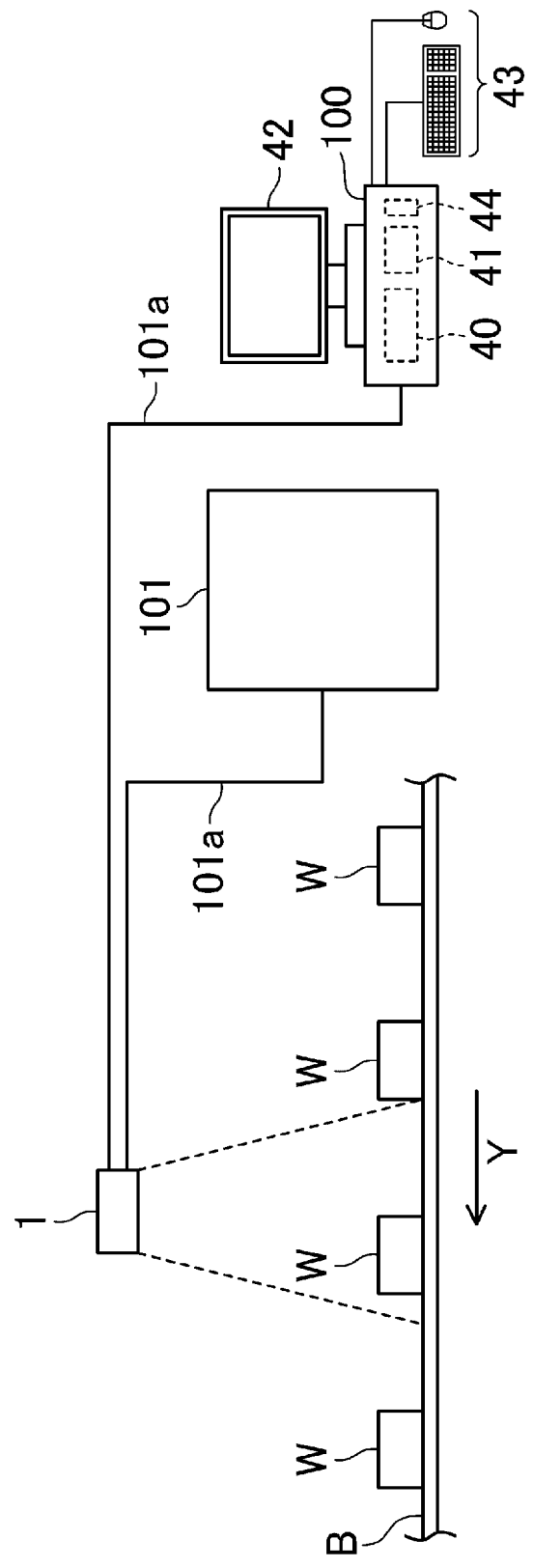
FIG. 1 is a view illustrating the operation time of an optical reading device according to an embodiment of the present aspect.

FIG. 1 is a view schematically illustrating the operation time of an optical reading device 1 according to the embodiment of the present aspect. In this example, a plurality of workpieces W are conveyed in a direction of arrow Y in FIG. 1 in the state of being placed on an upper surface of a conveying belt conveyor B, the optical reading device 1 according to the embodiment is installed at a place separated upward from the workpieces W. The workpiece W sometimes flows not only in the central portion of the upper surface of the conveying belt conveyor B in a width direction but also on one side and the other side in the state of being offset in the width direction, and the workpiece W does not always pass through a fixed position.

The optical reading device 1 can be used, for example, in a distribution center or the like. Conveyed objects (workpieces W) having various sizes and shapes are conveyed at high speed on the conveying belt conveyor B installed in the distribution center. In addition, an interval between the workpieces W in a conveying direction is also set to be narrow. Further, the workpiece W has a plurality of codes CD1 and CD2 attached thereto in some cases, but has only one code attached thereto in other cases.

In this example, types of the first code CD1 and the second code CD2 are different, the first code CD1 is a one-dimensional code, and the second code CD2 is a two-dimensional code. A typical example of the first code CD1 is a bar code, and examples thereof can include a JAN code, an ITF code, GS1-128, and the like. Typical examples of the second code CD2 are a QR code (registered trademark), a micro QR code, a data matrix (data code), a Veri code, an Aztec code, PDF 417, a Maxi code, and the like. The second code CD2 has a stack type and a matrix type, and the present aspect can be applied to any two-dimensional code. The first code CD1 and the second code CD2 may be attached by printing or engraving directly on the workpiece W, may be attached by being pasted to the workpiece W after being printed on a label or the like, and any mechanism or method may be used. In addition, a plurality of one-dimensional codes or a plurality of two-dimensional codes may be attached to the workpiece W. Although it is assumed that the first code CD1 and the second code CD2 are attached to the workpiece W in the following description, the present aspect is not applied by being limited to such a code attachment form, and can be also applied to a form in which only one code or three or more codes are attached.

As illustrated in FIG. 1, the optical reading device 1 is a device that optically reads the first code CD1 and the second code CD2 (illustrated in FIG. 2) attached to the workpiece W, and is specifically a code reader configured to capture the images of the first code CD1 and the second code CD2 attached to the workpiece W to generate a read image, and to be capable of executing a decoding process of the first code CD1 and the second code CD2 included in the generated read image and outputting a decoding result.

The optical reading device 1 can be configured as a stationary optical reading device that is used in the state of being fixed to a bracket or the like (not illustrated) so as not to move during its operation, but may be operated while being gripped and moved by a robot (not illustrated) or a user. In addition, the first code CD1 and the second code CD2 of the workpiece W in the stationary state may be read by the optical reading device 1. The operation time is the time during which an operation of reading the first codes CD1 and the second codes CD2 of the workpieces W sequentially conveyed by the conveying belt conveyor B is performed. The optical reading device 1 of the present embodiment is suitable for a situation where it is desired to read the first code CD1 and the second code CD2 attached to the workpiece W whose position varies, but it not limited thereto, and can be also used even in the case of reading the first code CD1 and the second code CD2 attached to the workpiece W whose position does not vary.

As illustrated in FIG. 1, the optical reading device 1 is connected to a computer 100 and a programmable logic controller (PLC) 101 as external control devices in a wired manner by signal lines 101a and 101a, respectively. However, the aspect is not limited thereto, and the optical reading device 1, the computer 100, and the PLC 101 may have built-in communication modules to wirelessly connect the optical reading device 1 with the computer 100 and the PLC 101. The PLC 101 is a control device configured for sequence control of the conveying belt conveyor B and the optical reading device 1, and can use a general-purpose PLC.

The computer 100 can use a general-purpose or dedicated electronic computer, a portable terminal, or the like. In this example, a so-called personal computer is used, and includes a control unit 40, a storage device 41, a display unit 42, an input unit 43, and a communication unit 44. As the optical reading device 1 is downsized, it is difficult to make the entire setting of the optical reading device 1 using only the display unit 7, buttons 8 and 9, and the like of the optical reading device 1. Thus, the computer 100 may be prepared separately from the optical reading device 1 such that the computer 100 makes various settings of the optical reading device 1 and transfers setting information to the optical reading device 1.

In addition, since the computer 100 includes the communication unit 44, the computer 100 and the optical reading device 1 may be connected to enable bidirectional communication such that a part of processing of the optical reading device 1 described above is performed by the computer 100. In this case, a part of the computer 100 serves as some components of the optical reading device 1.

The control unit 40 is a unit that controls each unit provided in the computer 100 based on a program stored in the storage device 41. The storage device 41 is constituted by various memories, a hard disk, a solid state drive (SSD), and the like. The display unit 42 is constituted by, for example, a liquid crystal display and the like. The input unit 43 is constituted by a keyboard, a mouse, a touch sensor, and the like. The communication unit 44 is a portion that communicates with the optical reading device 1. The communication unit 44 may have an I/O unit connected to the optical reading device 1, a serial communication unit such as RS232C, and a network communication unit such as a wireless LAN and a wired LAN.

The control unit 40 generates a user interface image to set an imaging condition of the imaging unit 5 and an image processing condition of the processing unit 23 in the optical reading device 1 and a user interface image or the like to display a decoding result, image data, or the like output from the optical reading device 1, and causes the display unit 42 to display the user interface image. The display unit 42 may constitute a part of the optical reading device 1. The storage device 41 is a portion that stores the decoding result, which is a result of a decoding process executed by the processing unit 23, the image captured by the imaging unit 5, various types of setting information, and the like.

In addition, the optical reading device 1 receives a reading start trigger signal that defines reading start timings of the first code CD1 and the second code CD2 from the PLC 101 via the signal line 101a during its operation time. Further, the optical reading device 1 performs imaging and a decoding process of the workpiece W based on the reading start trigger signal. Thereafter, the decoding result obtained by the decoding process is transmitted to the PLC 101 via the signal line 101a. In this manner, during the operation time of the optical reading device 1, the input of the reading start trigger signal and the output of the decoding result are repeatedly performed via the signal line 101a between the optical reading device 1 and the external control device such as the PLC 101. Note that the input of the reading start trigger signal and the output of the decoding result may be performed via the signal line 101a between the optical reading device 1 and the PLC 101 as described above, or may be performed via another signal line (not illustrated). For example, a sensor configured to detect arrival of the workpiece W at a predetermined position and the optical reading device 1 are directly connected to each other to input the reading start trigger signal from the sensor to the optical reading device 1. In addition, the decoding result, the image, and various types of setting information can be output to a device other than the PLC 101, for example, the computer 100.

[Overall Configuration of Optical Reading Device 1]

Figure 5:
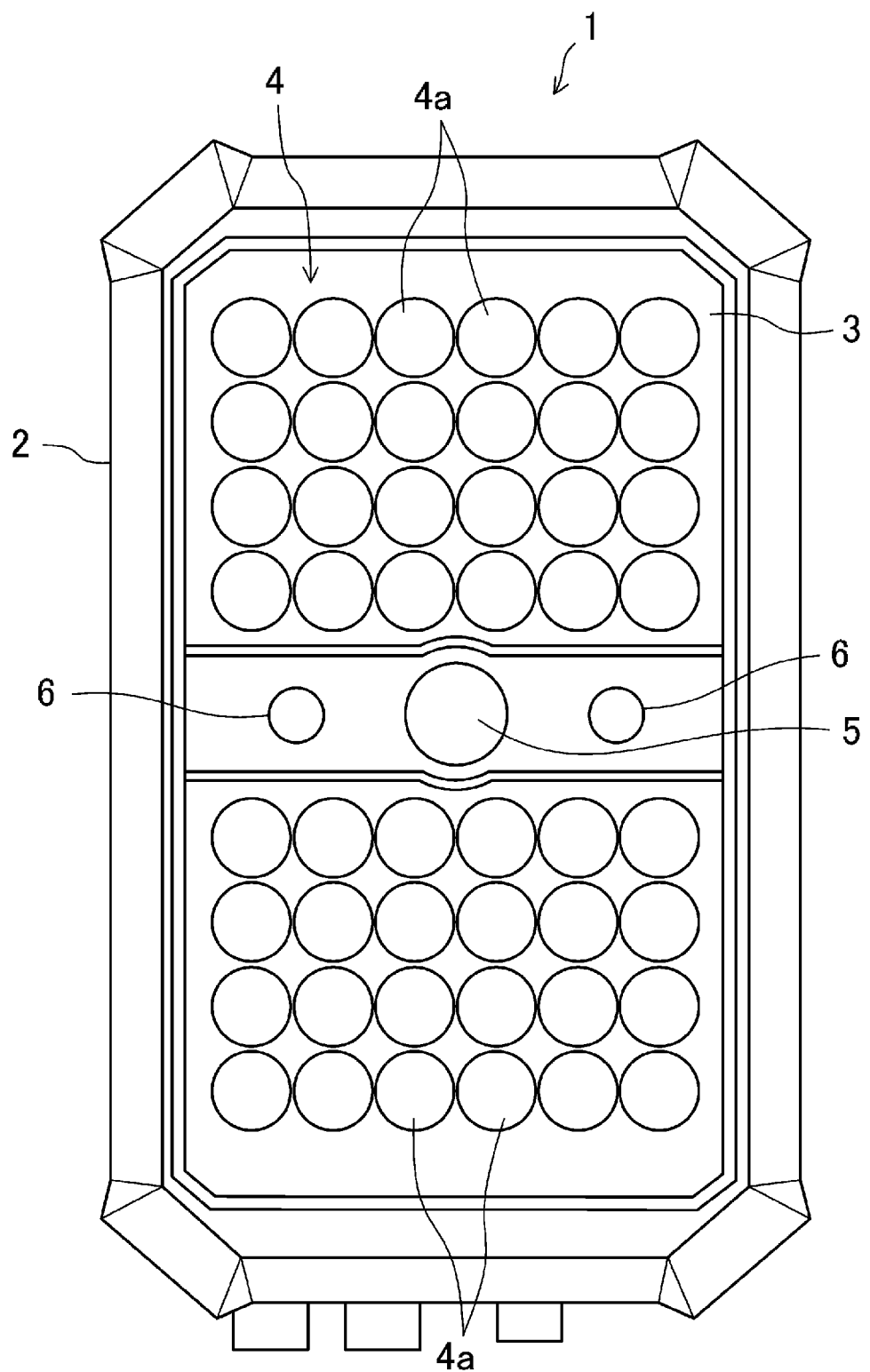
FIG. 5 is a front view of the optical reading device.
Figure 6:
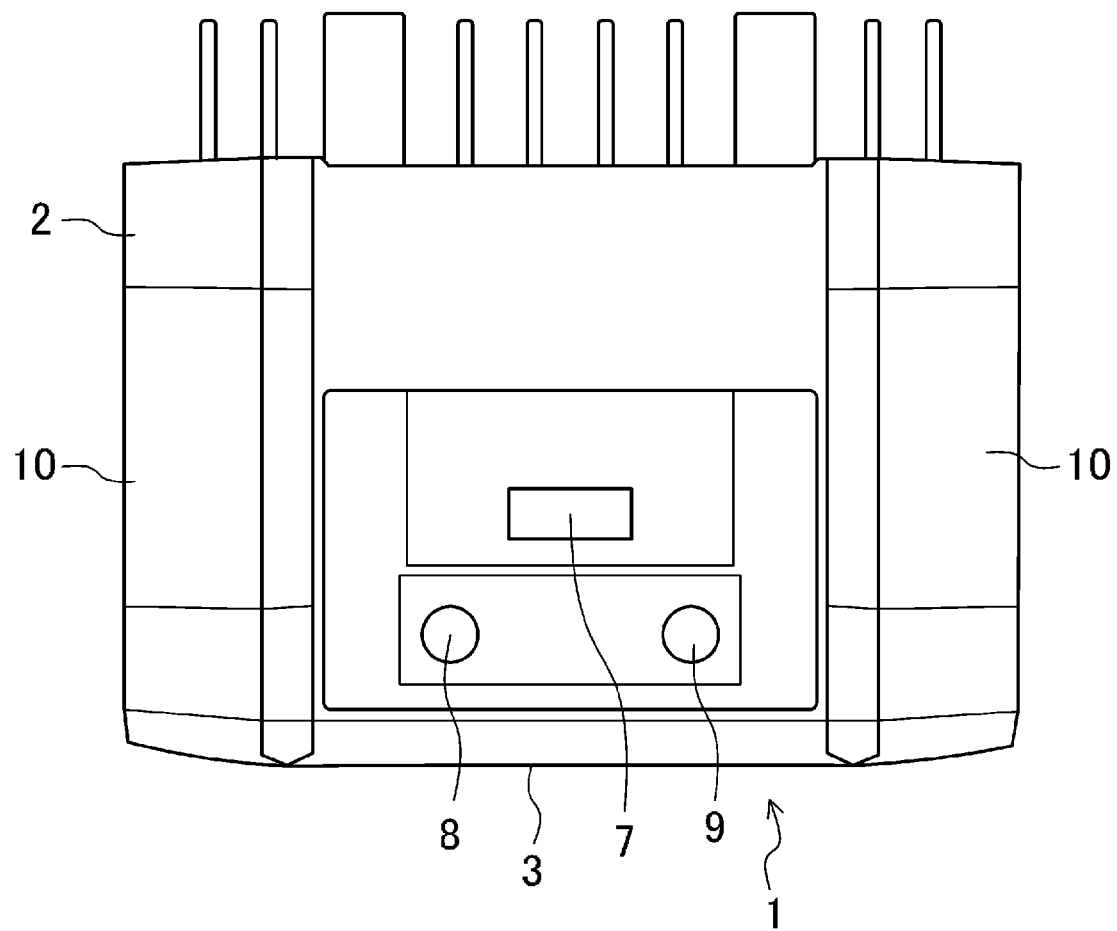
FIG. 6 is a view of the optical reading device as viewed from an operation button side.
Figure 7:
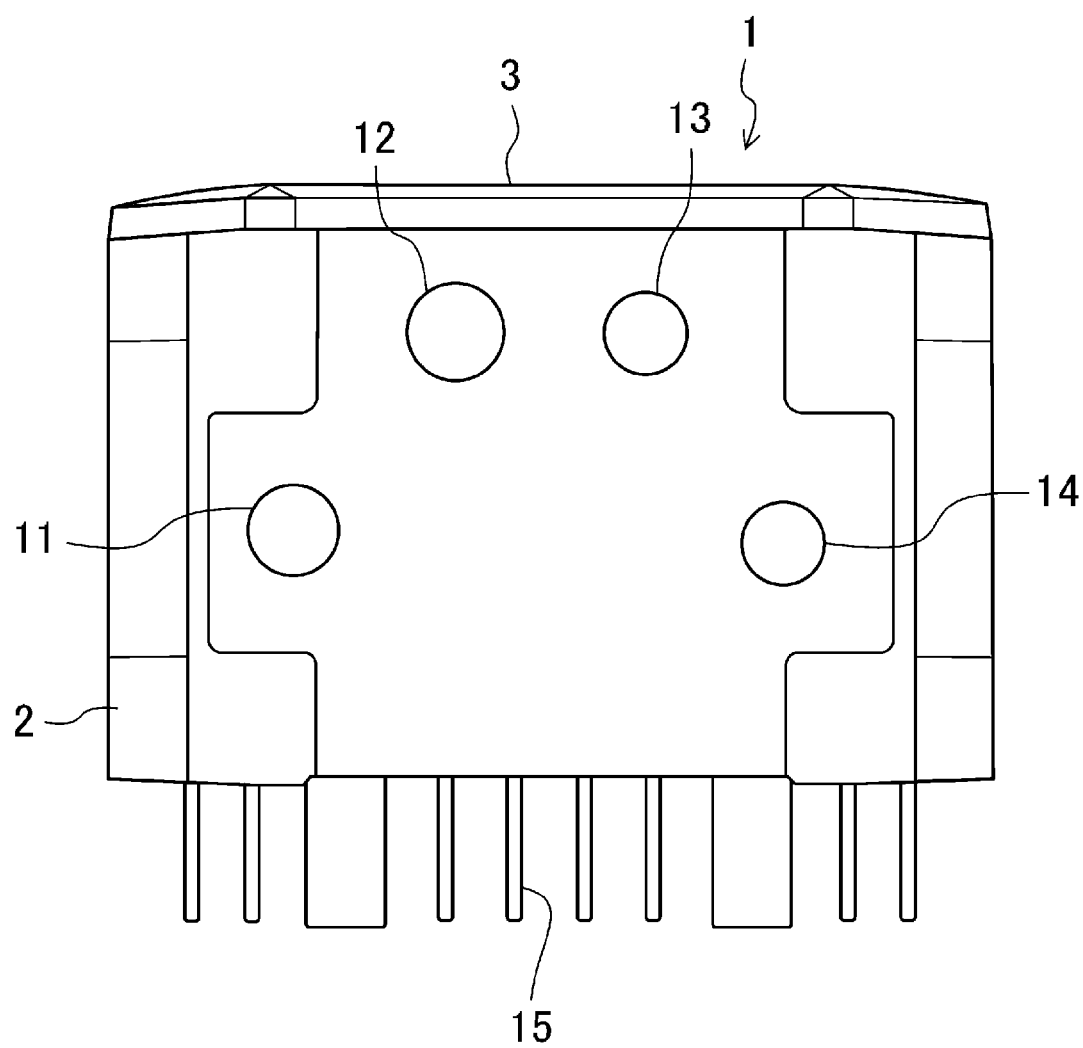
FIG. 7 is a view of the optical reading device as viewed from a terminal side.

As illustrated in FIGS. 5 to 7, the optical reading device 1 includes a housing 2 and a front cover 3. As illustrated in FIG. 5, an illumination unit 4, an imaging unit 5, and an aimer 6 are provided on a front surface of the housing 2. Configurations of the illumination unit 4 and the imaging unit 5 will be described later. The aimer 6 is configured using, for example, a light emitting body such as a light emitting diode. The aimer 6 is configured to emit light toward the front of the optical reading device 1 to indicate an imaging range of the imaging unit 5 and a guideline for an optical axis of the illumination unit 4. A user can also refer to the light emitted from the aimer 6 to install the optical reading device 1.

In addition, one end surface of the housing 2 is provided with the display unit 7, a select button 8, an enter button 9, and an indicator 10 as illustrated in FIG. 6. A configuration of the display unit 7 will be described later. The select button 8 and the enter button 9 are buttons used for setting or the like of the optical reading device 1, and are connected to a control section 20. The control section 20 can detect operating states of the select button 8 and the enter button 9. The select button 8 is a button that is operated when selecting one from among a plurality of options displayed on the display unit 7. The enter button 9 is a button that is operated when confirming a result selected by the select button 8. The indicator 10 is connected to the control section 20 and can be configured using a light emitting body such as a light emitting diode. The operating state of the optical reading device 1 can be notified to the outside by a lighting state of the indicator 10.

In addition, a power connector 11, a network connector 12, a serial connector 13, and a USB connector 14 are provided on the other end surface of the housing 2 as illustrated in FIG. 7. In addition, a heat sink 15 serving as a rear case is provided on a back surface of the housing 2. A power wiring configured to supply power to the optical reading device 1 is connected to the power connector 11. The serial connector 13 corresponds to the signal lines 100a and 101a connected to the computer 100 and the PLC 101, and the network connector 12 is an Ethernet connector. Note that the Ethernet standard is an example, and signal lines of standards other than the Ethernet standard can be also used.

Figure 3:
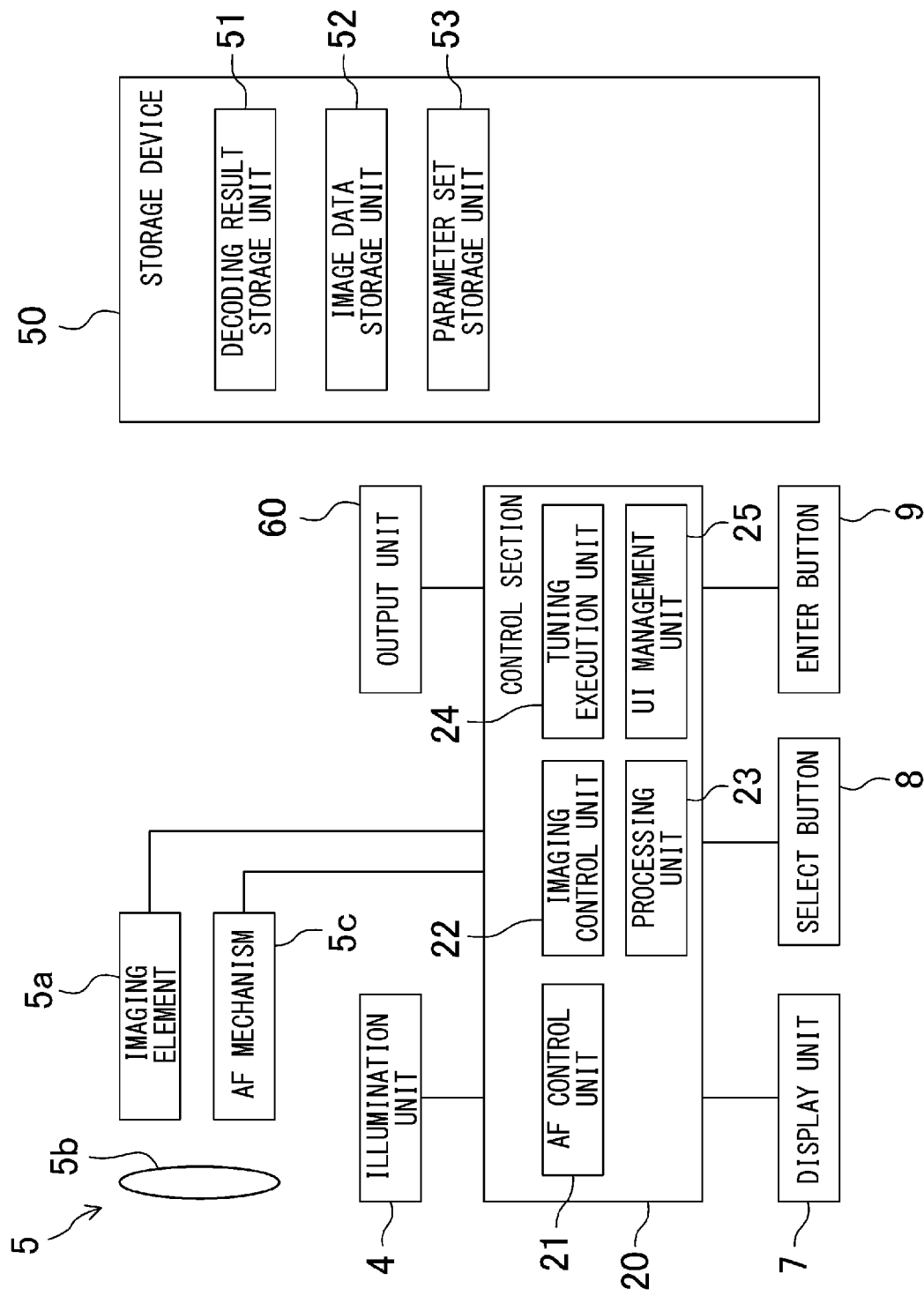
FIG. 3 is a block diagram of the optical reading device.

Further, the control section 20, a storage device 50, an output unit 60, and the like illustrated in FIG. 3 are provided inside the housing 2. These will be described later.

Although the front surface and the back surface of the optical reading device 1 are defined as described above in the description of the present embodiment, this is given merely to achieve the convenience of the description, and does not limit the orientation during the operation time of the optical reading device 1. That is, as illustrated in FIG. 1, the optical reading device 1 can be installed and used with the front surface directed substantially downward, the optical reading device 1 can be installed and used with the front surface directed upward, the optical reading device 1 can be installed and used with the front surface directed downward and inclined, or the optical reading device 1 can be installed and used with the front surface extending along a vertical plane.

[Configuration of Illumination Unit 4]

As indicated by the broken line in FIG. 5, the illumination unit 4 is a member configured to emit light toward an area through which the workpiece W conveyed by the conveying belt conveyor B passes. The light emitted from the illumination unit 4 illuminates at least a predetermined range in the conveying direction of the conveying belt conveyor B. This predetermined range is a range wider than a dimension in the same direction of the largest workpiece W assumed to be conveyed during the operation time. The illumination unit 4 illuminates the first code CD1 and the second code CD2 attached to the workpiece W conveyed by the conveying belt conveyor B.

The illumination unit 4 includes a light emitting body 4a made of a light emitting diode or the like, for example, and the light emitting body 4a may be one, or a plurality of light emitting bodies 4a may be provided. In this example, the plurality of light emitting bodies 4a are provided, and the imaging unit 5 faces the outside between the light emitting bodies 4a. In addition, the light of the aimer 6 is emitted from a portion between the light emitting bodies 4a. The illumination unit 4 is electrically connected to an imaging control unit 22 of the control section 20 and can be controlled by the control section 20 to be turned on and off at arbitrary timings.

In this example, the illumination unit 4 and the imaging unit 5 are mounted on the single housing 2 to be integrated, but the illumination unit 4 and the imaging unit 5 may be configured as separate bodies. In this case, the illumination unit 4 and the imaging unit 5 can be connected in a wired or wireless manner. In addition, the control section 20, which will be described later, may be built in the illumination unit 4 or the imaging unit 5. The illumination unit 4 mounted on the housing 2 is referred to as an internal lighting, and the illumination unit 4 configured as a separate body from the housing 2 is referred to as an external lighting. It is also possible to illuminate the workpiece W using both the internal lighting and the external lighting.

[Configuration of Imaging Unit 5]

FIG. 3 is a block diagram illustrating the configuration of the optical reading device 1. The imaging unit 5 is a member configured to receive light emitted from the illumination unit 4 and reflected from an area through which the workpiece W passes, and generate a read image obtained by capturing the image of the area through which the workpiece W passes. As the imaging unit 5, an area camera in which pixels are arrayed vertically and horizontally (X direction and Y direction) can be used. As a result, it is possible to support reading of a two-dimensional code and to capture the images of one workpiece W being conveyed a plurality of times.

As illustrated in FIG. 3, the imaging unit 5 includes: an imaging element 5a that can capture the image of at least a portion of the workpiece W to which the first code CD1 and the second code CD2 are attached; an optical system 5b having lenses and the like; and an autofocus mechanism (AF mechanism) 5c. Light reflected from at least the portion of the workpiece W to which the first code CD1 and the second code CD2 are attached is incident on the optical system 5b. The imaging element 5a is an image sensor including a light receiving element such as a charge-coupled device (CCD) or a complementary metal oxide semiconductor (CMOS) that converts an image having the first code CD1 and the second code CD2 obtained through the optical system 5b into an electrical signal.

The AF mechanism 5c is a mechanism that performs focusing by changing a position and a refractive index of a focusing lens among the lenses constituting the optical system 5b. The AF mechanism 5c is connected to the control section 20 and is controlled by an AF control unit 21 of the control section 20.

The imaging element 5a is connected to the imaging control unit 22 of the control section 20. The imaging element 5a is controlled by the imaging control unit 22 and is configured to be capable of capturing an image of an area through which the workpiece W passes at predetermined fixed time intervals and capturing an image of an area through which the workpiece W passes at arbitrary timings with changed time intervals. The imaging unit 5 is configured to be capable of executing so-called infinite burst imaging in which successive generation of read images is continued. As a result, it is possible to capture the codes CD1 and CD2 of the workpiece W moving at high speed into the read image without missing the codes CD1 and CD2, and it is possible to generate a plurality of read images by capturing the images of one workpiece W being conveyed a plurality of times. Note that the imaging control unit 22 may be built in the imaging unit 5.

The intensity of light received by a light receiving surface of the imaging element 5a is converted into an electrical signal by the imaging element 5a, and the electrical signal converted by the imaging element 5a is transferred to the processing unit 23 of the control section 20 as image data constituting a read image. Specifically, the imaging element 5a generates a read image, and then, transfers the read image to the processing unit 23 line by line. One line corresponds to, for example, one column (or one row) in the vertical direction or horizontal direction of the imaging element 5a. To transfer the read image line by line is to perform transfer of brightness values of a plurality of pixels constituting a vertical column of the imaging element 5a or brightness values of a plurality of pixels constituting a horizontal column of the imaging element 5a to the processing unit 23 and then transfer of brightness values of a plurality of pixels constituting a column next to the transferred column to the processing unit 23 sequentially in a direction in which columns are arrayed. Note that, after generating the read image, the imaging element 5a may transfer the entire read image to the processing unit 23 at once without performing the transfer to the processing unit 23 line by line. This can be controlled by, for example, the imaging control unit 22.

[Configuration of Display Unit 7]

The display unit 7 is configured using, for example, an organic EL display, a liquid crystal display, or the like. The display unit 7 is connected to the control section 20 as illustrated in FIG. 3. On the display unit 7, for example, the images of the codes CD1 and CD2 captured by the imaging unit 5, and a character string, a read success rate, a matching level (reading margin), and the like, which are decoding results of the codes CD1 and CD2, can be displayed. The read success rate is an average read success rate when read processing is executed a plurality of times. The matching level is a reading margin that indicates the ease of reading the codes CD1 and CD2 that have been successfully decoded. This can be obtained from the number of error corrections having occurred during decoding, and can be expressed numerically, for example. The matching level (reading margin) increases as the error corrections decrease, and the matching level (reading margin) decreases as the error corrections increase.

[Configuration of Storage Device 50]

The storage device 50 is constituted by various memories, a hard disk, an SSD, and the like. The storage device 35 is provided with a decoding result storage unit 51, an image data storage unit 52, and a parameter set storage unit 53. The decoding result storage unit 51 is a portion that stores a decoding result which is a result obtained by executing a decoding process using the processing unit 23. The image data storage unit 52 is a portion that stores an image captured by the imaging unit 5. The parameter set storage unit 53 is a portion that stores setting information set by a setting device such as the computer 100, setting information set by the select button 8 and the enter button 9, setting information obtained as a result of executing tuning by the tuning execution unit 24, and the like. The parameter set storage unit 53 can store a plurality of parameter sets including a plurality of parameters constituting imaging conditions (gain, the amount of light of the illumination unit 4, exposure time, and the like) of the imaging unit 5 and image processing conditions (a type of image processing filter and the like) in the processing unit 23.

FIG. 8 is a view illustrating a display example of the plurality of parameter sets. The control unit 40 of the computer 100 can generate a user interface image 300 as illustrated in FIG. 8 and causes the display unit 42 of the computer 100 to display the user interface image 300. A plurality of tabs 301, 302, and 303 are provided on the upper part of the user interface image 300, and any one of the plurality of tabs 301, 302, and 303 can be selected.

In this example, a case where the tab 302 of a bank has been selected is illustrated. One parameter set is referred to as the "bank". In the example illustrated in FIG. 8, only Bank 1 and Bank 2 are displayed, but the number of banks can be set arbitrarily.

As a common setting item for each bank, provided are "decoding timeout value" that indicates the timeout time of a decoding process, "black and white inversion" that inverts black and white of a read image, "internal lighting" that switches on and off of the internal lighting constituted by the illumination unit 4 mounted on the housing 2, "external lighting" that switches on and off of the external lighting constituted by the illumination unit 4 configured as a separate body from the housing 2, and "detailed code settings" for switching a code type. In addition, as reading setting items, "exposure time" that indicates the exposure time by the imaging unit 5, "gain" that indicates the gain of the imaging unit 5, "contrast adjustment scheme" that indicates a method for adjusting the contrast of a read image, a "first image filter" and a "second image filter" that select types and order of image filters to be applied, and the like are provided in each bank.

In the optical reading device 1, the user can select a bank to be used during the operation time of the optical reading device 1 from among a plurality of banks stored in the parameter set storage unit 53.

That is, the user can operate the input unit 43 of the computer 100 while viewing the user interface image 300 illustrated in FIG. 8 and select an arbitrary bank on the user interface image 300. The input unit 43 is a receiving unit that receives the user's selection on a first bank (Bank 1) and a second bank (Bank 2) from among the plurality of banks stored in the storage device 50. Note that Bank 1 is a parameter set for reading a one-dimensional code, and Bank 2 is a parameter set for reading a two-dimensional code.

Note that the bank can be selected, for example, by operating a button (not illustrated) displayed on the user interface image 300.

[Configuration of Output Unit 60]

The optical reading device 1 has the output unit 60. The output unit 60 is a portion that outputs a decoding result obtained by a decoding process of the processing unit 23 to be described later. Specifically, when the decoding process is completed, the processing unit 23 transmits the decoding result to the output unit 60. The output unit 60 can be constituted by a communication unit that transmits data related to the decoding result received from the processing unit 23 to, for example, the computer 100 and the PLC 101. The output unit 60 may have an I/O unit connected to the computer 100 and the PLC 101, a serial communication unit such as RS232C, and a network communication unit such as a wireless LAN or a wired LAN.

[Configuration of Control Section 20]

The control section 20 illustrated in FIG. 3 is a section configured to control each part of the optical reading device 1, and can be configured using a CPU, an MPU, a system LSI, a DSP, dedicated hardware, or the like. The control section 20 is equipped with various functions as will be described later, and these may be implemented by a logic circuit or may be implemented by executing software.

The control section 20 includes the AF control unit 21, the imaging control unit 22, the processing unit 23, the tuning execution unit 24, and a UI management unit 25. The AF control unit 21 is a portion that performs focusing of the optical system 5b by conventionally known contrast AF and phase difference AF. The AF control unit 21 may be included in the imaging unit 5.

[Configuration of Imaging Control Unit 22]

The imaging control unit 22 is a portion that controls not only the imaging unit 5 but also the illumination unit 4. That is, the imaging control unit 22 is configured as a unit that adjusts the gain of the imaging element 5a, controls the amount of light of the illumination unit 4, and controls the exposure time (shutter speed) of the imaging element 5a. The gain, the amount of light of the illumination unit 4, the exposure time, and the like are included in the imaging conditions of the imaging unit 5.

[Configuration of Processing Unit 23]

Figure 4:
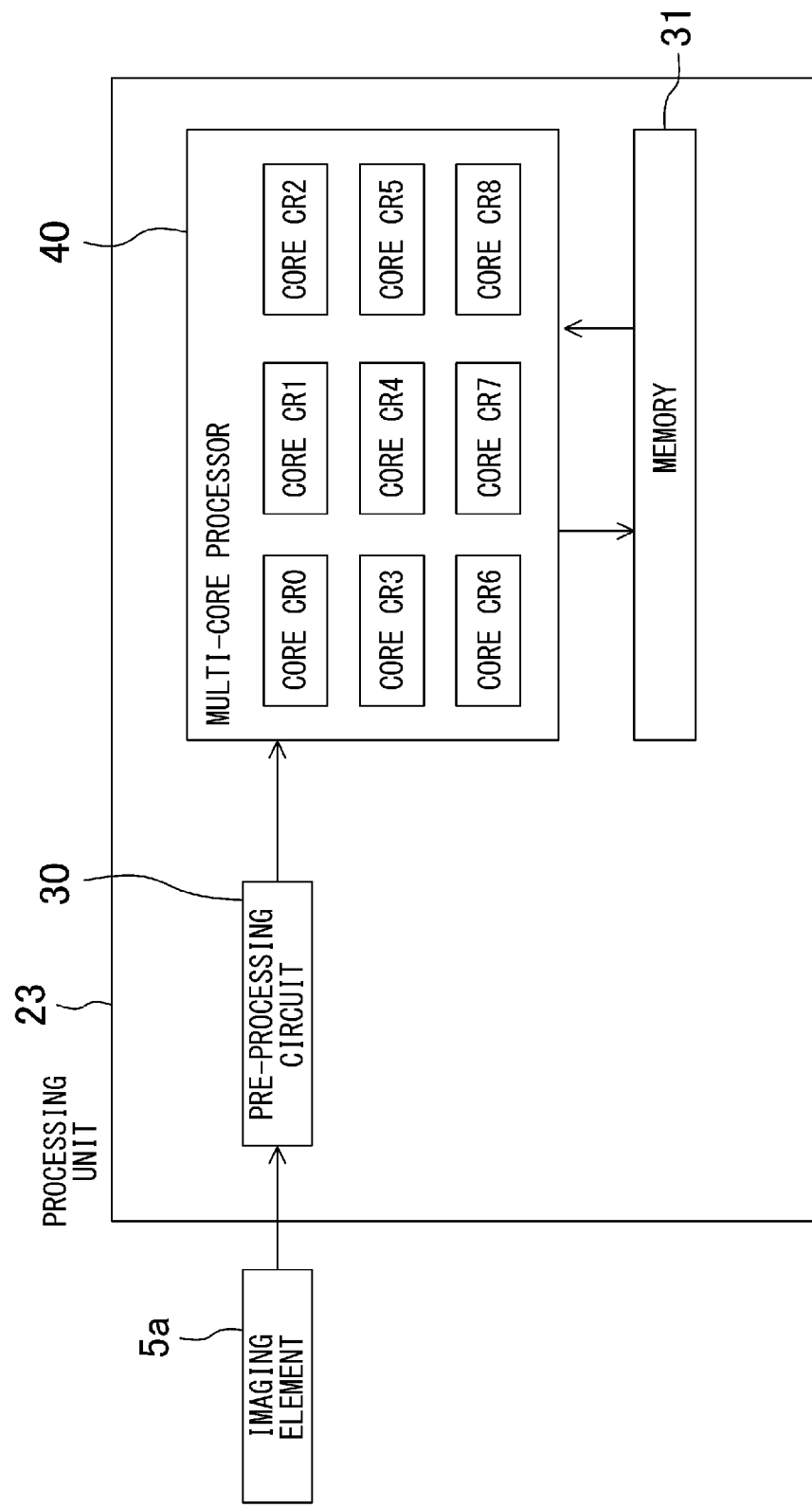
FIG. 4 is a block diagram illustrating a detailed structure of a processing unit provided in the optical reading device.

As illustrated in FIG. 4, the processing unit 23 includes a pre-processing circuit 30, a memory 31, and a processor 40. The image data for each line transferred from the imaging element 5a is input to the pre-processing circuit 30. The pre-processing circuit 30 is a pre-processor arranged at the front stage of the processor 40 and can be configured using, for example, a programmable logic device (PLD), and examples thereof can include an FPGA and an ASIC.

The pre-processing circuit 30 executes pre-processing on image data each time a predetermined number of lines of image data is acquired from the imaging element 5. The predetermined number of lines of image data is data forming a partial area of one read image. Accordingly, the pre-processing is executed for each of different areas of one read image.

The predetermined number of lines is an arbitrary number of lines of one or more, and is the number of lines required to detect likelihood of a code. Examples of the pre-processing can include a gradation conversion process, various image filtering processes, and the like. The pre-processing may include only one or a plurality of these processes. The gradation conversion process may be a process of lowering the gradation of image data captured by the imaging element 5a, and specifically, is a process of making the gradation to 8 bits when the gradation of the image data captured by the imaging element 5a is 12 bits. The pre-processing may include a reduced image generation process.

The pre-processing circuit 30 executes a code search data generation process after executing the pre-processing. The code search data generation process includes a process of calculating a characteristic amount indicating likelihood of a code for each area in pre-processed image data based on a brightness value of each pixel in the pre-processed image data. Specific examples of the characteristic amount can include a combination of edge image data, but are not limited thereto. After calculating the characteristic amount, the pre-processing circuit 30 generates a characteristic amount image to which a brightness value corresponding to the calculated characteristic amount has been assigned.

Figure 9:
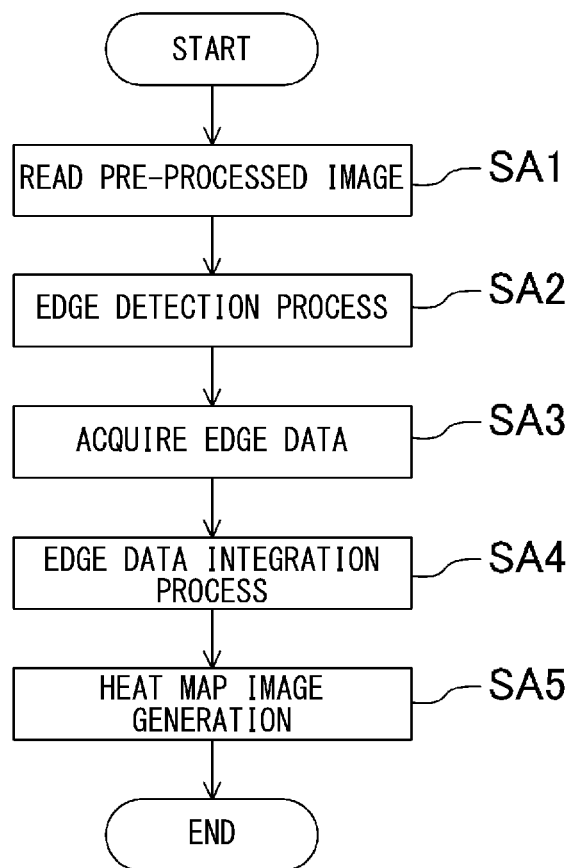
FIG. 9 is a flowchart illustrating an example of a code search data generation process when there is only one type of code.

The code search data generation process executed by the pre-processing circuit 30 will be described with reference to FIG. 9. FIG. 9 illustrates the code search data generation process when there is only one type of code attached to the workpiece W, and this code may be a one-dimensional code or a two-dimensional code. In Step SA1 after start, an image after having been subjected to the pre-processing in the pre-processing circuit 30, that is, the pre-processed image is read. Thereafter, the process proceeds to Step SA2, and the pre-processing circuit 30 executes edge detection processing on the pre-processed image to generate edge data. The edge detection processing can be executed using, for example, a Sobel filter or the like. For example, in the case of the one-dimensional code, a composite image may be generated by adding or the like for the X-direction Sobel and the Y-direction Sobel if a rotation angle of a bar code is 0° and 90°, respectively, and for the X-direction Sobel and Y-direction Sobel images if there is no premise for the rotation angle of the bar code.

In Step SA2, as an image after having been subjected to the edge detection processing, for example, an edge strength image, an edge angle image, and the like can be generated, and an image obtained by executing common convolution processing and arithmetic processing may be further generated. In addition, not only first-order differential processing but also second-order differential processing can be used as the edge detection processing.

In Step SA3, the edge image data generated in Step SA2 is acquired. Thereafter, the process proceeds to Step SA4, and an edge image data integration process of integrating edge image data of a certain pixel and its vicinity is executed. For example, there is a high possibility that a code exists in an area where pixels having large brightness values gather in the edge image data, and thus, the area can be presumed as a code candidate area. It is possible to express the area where the pixels having large brightness values gather by integrating the edge image data of the certain pixel and its vicinity constituting the edge image data. In this example, it is possible to execute a product-sum calculation process or a pixel integration process configured to generate data for measuring the degree of gathering of edge image data within a certain area. For example, a smoothing process that has an effect of adding pixel values within a specific window size can be used. In addition, a reduction process may be used. When the reduction process is used, the amount of data decreases, so that there is an advantage that the amount of scanning can be small.

Through Steps SA2 to SA4, the pre-processing circuit 30 can calculate the characteristic amount indicating the likelihood of the code for each area in the pre-processed image data, and generate the characteristic amount image to which the brightness value corresponding to the calculated characteristic amount is assigned. In the characteristic amount image, an area with a large characteristic amount can be displayed brighter or darker than an area with a small characteristic amount, so that a so-called heat map image can be obtained and generated based on the edge data. That is, the edge detection processing is executed on the image data to generate the edge data, and then, the edge data integration process of integrating the edge data of the certain pixel and its vicinity is executed. Then, the process proceeds to Step SA5, and the heat map image which is the characteristic amount image can be generated.

Figure 2:
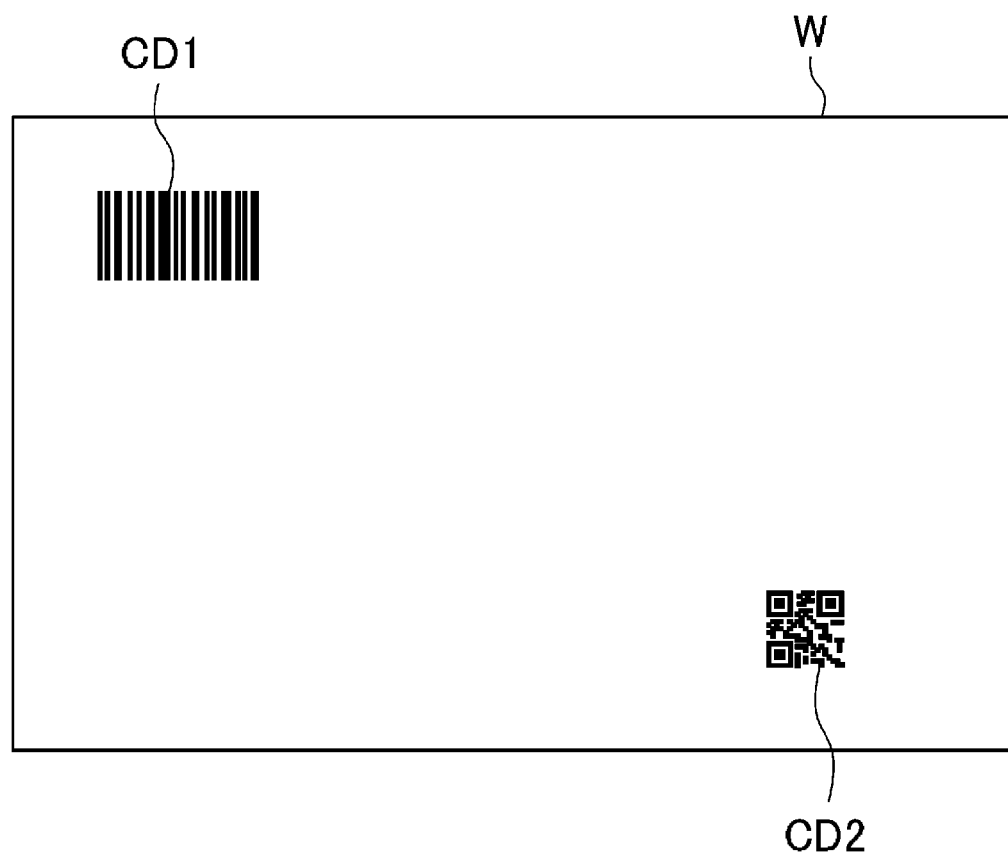
FIG. 2 is a view illustrating an example of a workpiece on which a one-dimensional code and a two-dimensional code have been attached.
Figure 10A:
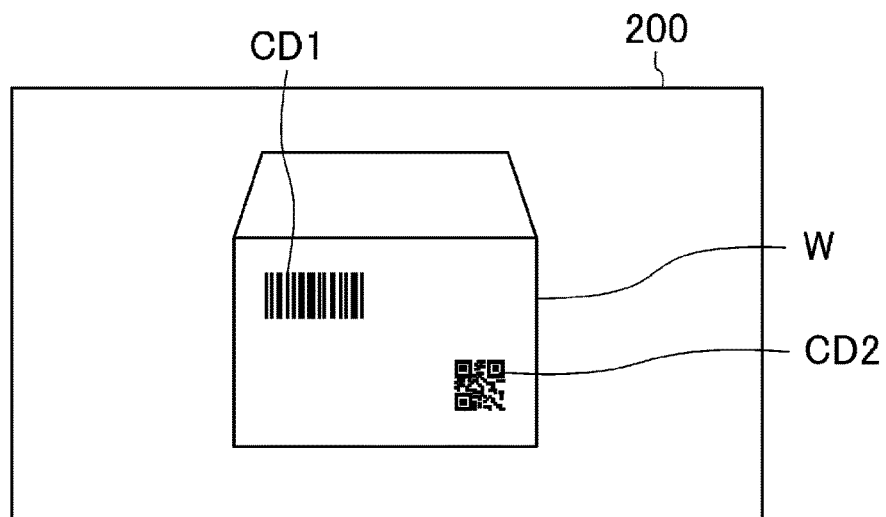
FIG. 10A is a view illustrating an example of a read image.

FIG. 10A is a view illustrating an example of a read image 200 generated by capturing an image of the workpiece W illustrated in FIG. 2 with the imaging unit 5. The read image 200 includes the first code CD1 which is a one-dimensional code and the second code CD2 which is a two-dimensional code.

Figure 10B:
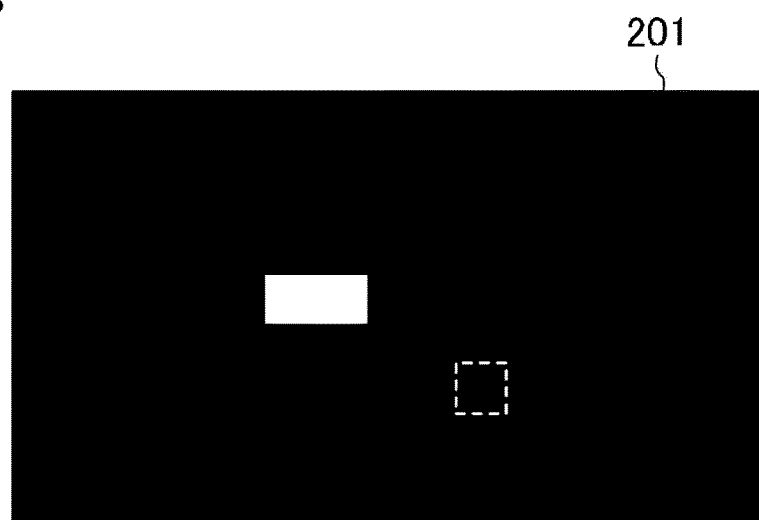
FIG. 10B is a view illustrating an example of a one-dimensional code heat map image.

FIG. 10B is a view illustrating an example of a one-dimensional code heat map image 201 to which brightness values are assigned according to the characteristic amount (first characteristic amount) indicating the likelihood of the one-dimensional code. In the one-dimensional code heat map image 201, a brightness value of a candidate area for the one-dimensional code is high, and brightness values of the other areas (areas where the one-dimensional code does not exist) are low. In FIG. 10B, the white portion illustrates the candidate area for the one-dimensional code, and the black portion illustrates the other area. Although the two-dimensional code exists in an area surrounded by the white dashed line in FIG. 10B, the brightness value of the area having the code other than the one-dimensional code is low since the heat map image 201 is generated based on the characteristic amount of the one-dimensional code in the above example. The one-dimensional code heat map image 201 is used by the processor 40 as one-dimensional code search data.

Although the heat map image 201 is generated based on the characteristic amount of the one-dimensional code in the above example, the pre-processing circuit 30 may also calculate a characteristic amount of the two-dimensional code, and generate a two-dimensional code heat map image 202 (illustrated in FIG. 10) based on the characteristic amount of the likelihood of the two-dimensional code without being limited thereto.

Figure 10C:
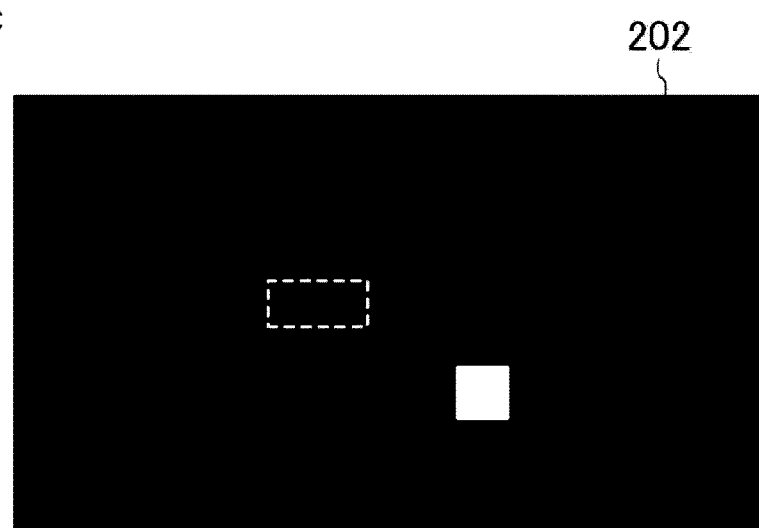
FIG. 10C is a view illustrating an example of a two-dimensional code heat map image.

FIG. 10C is a view illustrating the two-dimensional heat map image 202 to which brightness values are assigned according to the characteristic amount (second characteristic amount) indicating the likelihood of the two-dimensional code. In the two-dimensional code heat map image 202, a brightness value of a candidate area for the two-dimensional code is high, and brightness values of the other areas (areas where the two-dimensional code does not exist) are low. In FIG. 10C, the white portion illustrates the candidate area for the two-dimensional code, and the black portion illustrates the other area. Although the one-dimensional code exists in an area surrounded by the white dashed line in FIG. 10C, the brightness value of the area having the code other than the two-dimensional code is low since the heat map image 202 is generated based on the characteristic amount of the two-dimensional code in this example. The two-dimensional code heat map image 202 is used by the processor 40 as two-dimensional code search data.

Note that the white dashed lines in FIGS. 10B and 10C are illustrated only for the description and are not displayed in the actual heat map images 201 and 202. If there are a plurality of code candidate areas, the plurality of areas are illustrated in a heat map image. In addition, the heat map images 201 and 202 may be or are not necessarily presented to the user.

Figure 11:
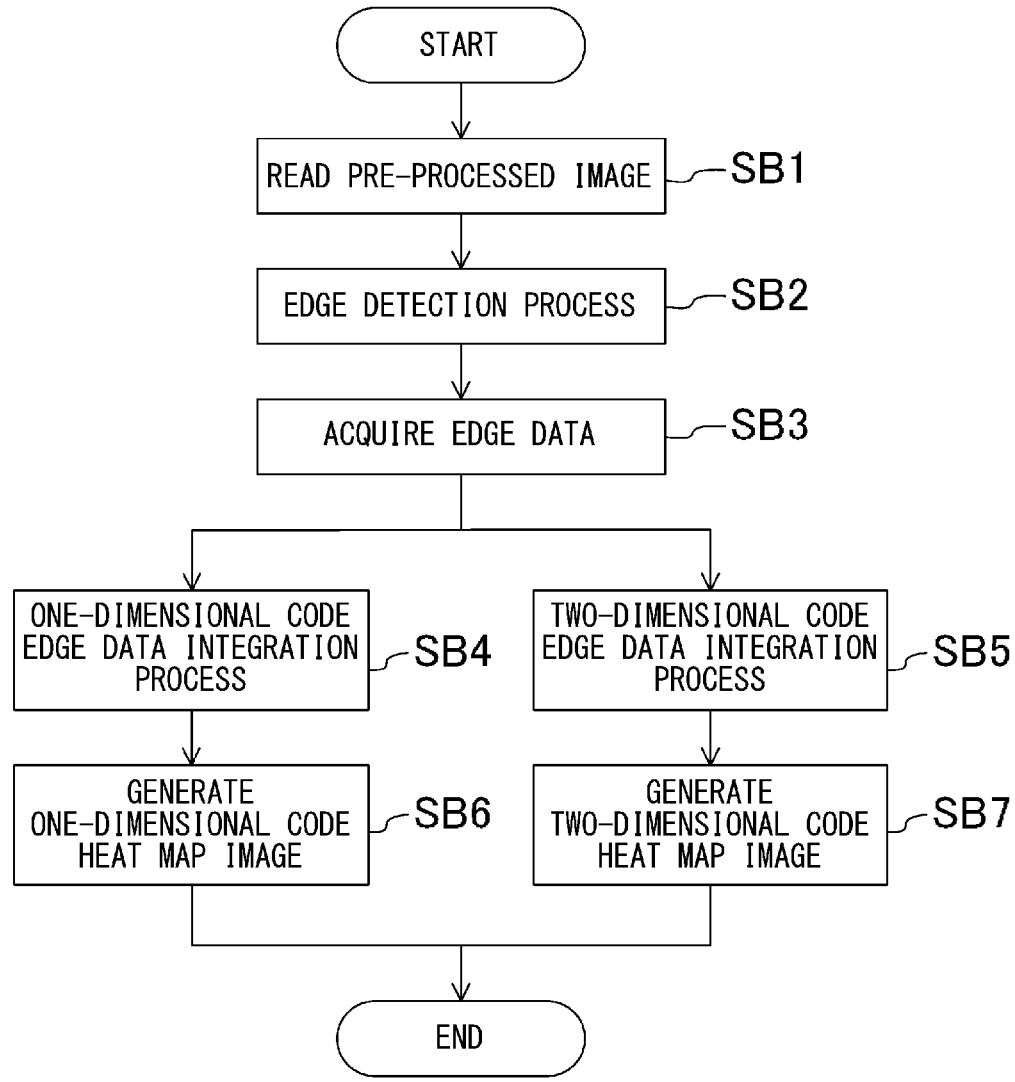
FIG. 11 is a flowchart illustrating an example of a code search data generation process when there are two types of codes.

FIG. 11 is a flowchart illustrating a procedure for generating the one-dimensional code heat map image 201 and the two-dimensional code heat map image 202 when both the one-dimensional code and the two-dimensional code are attached to one workpiece WK. Steps SB1 to SB3 are the same as Steps SA1 to SA3 in the flowchart illustrated in FIG. 9. In Step SB4, an edge image data integration process for the one-dimensional code is executed. In the edge image data integration process for the one-dimensional code, edges with aligned edge directions are integrated by utilizing shape characteristics of the one-dimensional code. For example, edge angle images are generated, those with close edge angles are added, and those with far edge angles are subtracted. In addition, a process of adding image data having close edge directions and subtracting image data having different edge directions may be executed within a certain range of the edge image data. Thereafter, the process proceeds to Step SB6, and the one-dimensional code heat map image 201 (see FIG. 10B) is generated as described in Step SA5 of the flowchart of FIG. 9.

In addition, in Step SB5, an edge image data integration process for the two-dimensional code is executed. In the edge image data integration process for the two-dimensional code, edges with irregular edge directions are integrated by utilizing shape characteristics of the two-dimensional code. For example, edge angle images are generated and those with close edge angles are averaged. In addition, a process of adding image data having different edge directions may be executed within a certain range of the edge image data. Thereafter, the process proceeds to Step SB7, and the two-dimensional code heat map image 202 (see FIG. 10) is generated as described in Step SA5 of the flowchart of FIG. 9. In the flowchart of FIG. 11, steps SB4 and SB6 and steps SB5 and SB7 may be performed in parallel, or one of them may be performed first.

As illustrated in FIG. 4, the processor 40 is a multi-core processor having a plurality of physical arithmetic processing devices (cores), acquires the characteristic amount calculated by the pre-processing circuit 30, determines the code candidate area in the read image based on the acquired characteristic amount, and executes a decoding process of the determined area to generate a decoding result. The output unit 60 outputs the generated decoding result.

As the acquisition form of the characteristic amount calculated by the pre-processing circuit 30, the characteristic amount itself may be used, or the form of acquiring the characteristic amount images (heat map images 201 and 202 illustrated in FIGS. 10B and 10) generated by the pre-processing circuit 30 may be used. When acquiring the characteristic amount image, the processor 40 can determine the code candidate area based on the acquired characteristic amount image.

That is, the processor 40 determines the candidate area for the first code CD1 based on the one-dimensional code heat map image 201, and also determines the candidate area for the second code CD2 based on the two-dimensional code heat map image 202. At this time, the processor 40 sets areas where the brightness values of the one-dimensional code heat map image 201 and the two-dimensional code heat map image 202 are equal to or higher than a predetermined value as the candidate area for the first code CD1 and the candidate area for the second code CD2, respectively, and thus, it is possible to accurately identify an area with a large characteristic amount. In this case, the decoding process of each determined area is executed to generate a decoding result.

As illustrated in FIG. 4, the processor 40 and the memory 31 are connected so as enable transmission and reception of data in this example. The memory 31 is configured using a high-speed memory such as a DDR RAM. The image data transferred from the imaging element 5a to the pre-processing circuit 30 is stored in the memory 31 via the processor 40. At this time, the processor 40 determines any address of the memory 31 at which the image data is to be stored, and stores the image data at the determined address at high speed. Since the image data is stored every time the imaging element 5a captures an image, a plurality of pieces of image data are stored in the memory 31. The processor 40 appropriately reads the image data from the memory 31, executes a decoding process, and stores a result thereof in the memory 31.

[Details of Decoding Process]

The processor 40 has nine cores of cores CR0 to CR8. The core CR0 is a core that instructs the other cores CR1 to CR8 to execute a decoding process of a read image generated by the imaging unit 5, and corresponds to the first core. The cores CR1 to CR8 are cores that acquire read images instructed by the core CR0 and execute a decoding process on the acquired read images, and correspond to the second cores. The first core that instructs the decoding process is the single core CR0, but the second cores that execute the decoding process are the eight cores CR1 to CR8. It suffices that the number of the second cores that execute the decoding process is two or more, and the number is not particularly limited. When executing the decoding process, the instructed read images may be transferred from the memory 31 to the cores CR1 to CR8 and then the decoding process may be executed on the transferred read images, or the decoding process may be executed after the cores CR1 to CR8 read the instructed read images from the memory 31. Note that the core CR0 may execute the decoding process.

The core CR0 instructs the cores CR1 to CR8, presumed to be capable of immediately executing the decoding process or executing the decoding process next to a decoding process being currently executed, to execute the decoding process. The decoding process is usually instructed to the cores CR1 to CR8 at different timings, and a plurality of decoding processes may be executed in parallel since each of the cores CR1 to CR8 executes the decoding process. That is, the cores CR1 to CR8 are configured to be capable of simultaneously executing the decoding process on read images instructed by the core CR0 at different timings.

Figure 12:
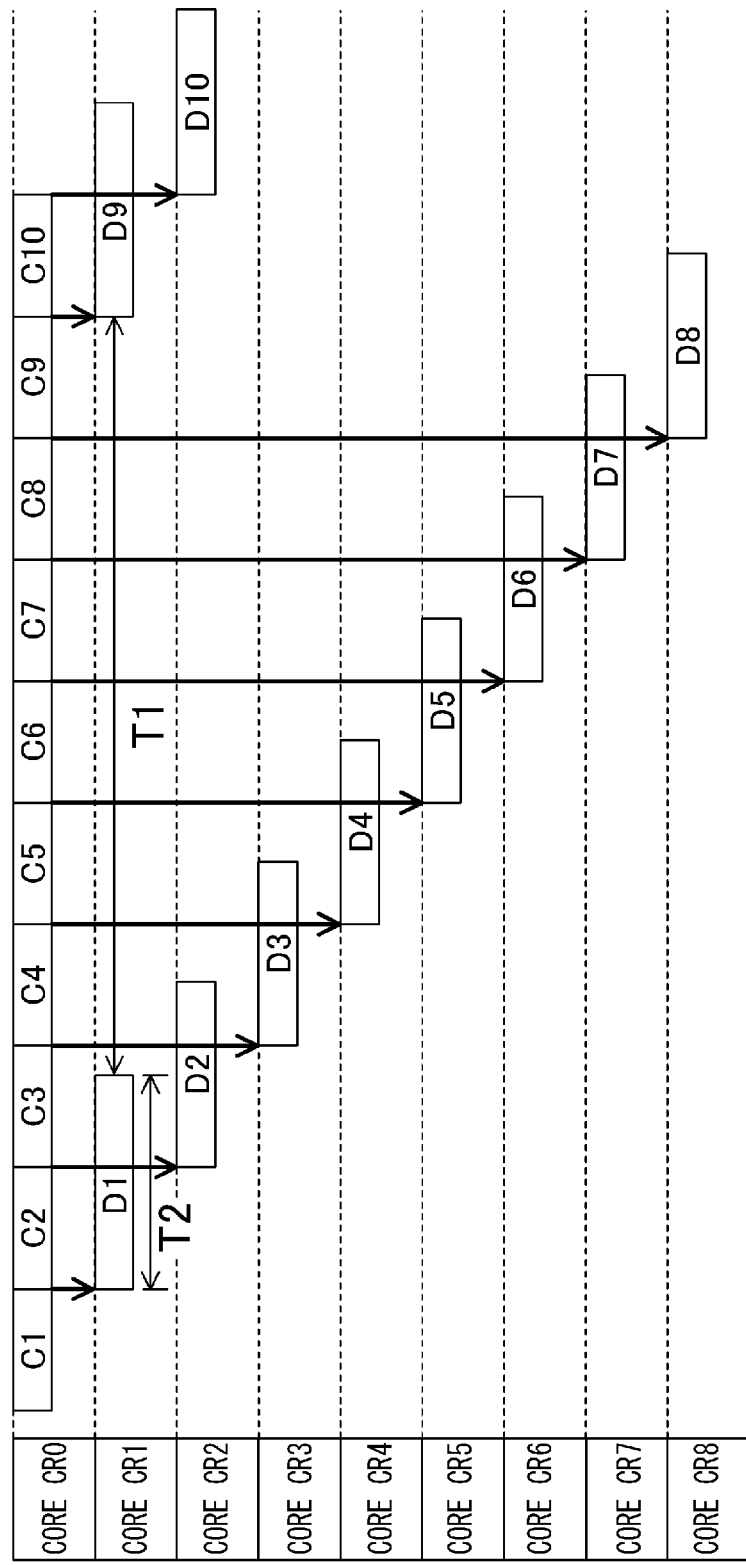
FIG. 12 is a timing chart illustrating an example of a case where a decoding process is executed on a plurality of read images.

Details of the decoding process of this example will be described hereinafter. FIG. 12 is a timing chart illustrating an example of a case where the decoding process is executed on a plurality of read images.

The imaging unit 5 captures images of the workpiece W and sequentially generates read images. In FIG. 12, C1 to C10 indicate the first to tenth read image generation processes, respectively. As illustrated in this drawing, the imaging unit 5 performs burst imaging so that the first read image generation process C1 to the tenth read image generation process C10 are successively executed. If an imaging interval is, for example, 30 fps, the time for one read image generation process is about 33 ms.

Meanwhile, D1 to D10 indicate first to tenth decoding processes, respectively, in FIG. 12. The time required for each decoding process is, for example, about 50 ms to 100 ms even in the case of high-speed processing, which is significantly longer than the time for the read image generation process (about 33 ms) by the imaging unit 5.

When the first read image generation process C1 is completed, the core CR0 that instructs the decoding process instructs the core CR1 to execute a decoding process of a read image generated by the first read image generation process C1. In addition, the core CR0 instructs the core CR2 to execute a decoding process of a read image generated by the second read image generation process C2 when the second read image generation process C2 is completed, and instructs the core CR3 to execute a decoding process of a read image generated by the third read image generation process C3 when the third read image generation process C3 is completed. In other words, if the core CR1 has been instructed to execute the decoding process and the cores CR2 and 3 have not been instructed to execute the decoding process, it is presumed that the cores CR2 and 3 are cores capable of immediately executing a decoding process, and in this case, the core CR0 instructs the cores CR2 and 3 to execute the decoding process. The same applies to the cores CR4 to CR8.

In addition, when the ninth read image generation process C9 is completed, the core CR0 instructs the core CR1 to execute a decoding process of a read image generated by the ninth read image generation process C9. Since the decoding process has been instructed to the cores CR2 to CR8, a certain amount of time has elapsed since the previous instruction, and it is presumed that the core CR1 is a core that can execute a decoding process immediately. In this case, the decoding process of the read image generated by the ninth read image generation process C9 can be executed by instructing the core CR1 to execute the decoding process. Similarly, the core CR2 is instructed to execute a decoding process of a read image generated by the tenth read image generation process C10. As the cores CR1 to CR8 are instructed to execute the decoding processes in order in this manner, at least two of the cores CR1 to CR8 execute the decoding processes at the same time.

Here, the time until the core CR0 stores the read image in the memory 31 after completion of the read image generation process and each of the cores CR1 to CR8 having been instructed to execute reading starts to read the read image is referred to as transfer time.

In addition, the cores CR1 to CR8 can execute the decoding process immediately after the transfer time has elapsed since the generation of the read image, and thus, there is no relation with the previous and subsequent processes, and there is no need to adjust the timing. Further, the imaging unit 5 can continue infinite burst imaging, and thus, it is possible to capture the code even during high-speed conveyance and to leave a successive image like a moving image.

T1 in FIG. 12 represents the time between the completion of the previous decoding process to the instruction of the next decoding process. Time T1 can be secured much longer than time T2 required for the decoding process. In other words, a long upper limit time of the decoding process can be secured, and an obfuscated code can be decoded. The upper limit time of the decoding process is a timeout time of the decoding process. When the decoding process takes a long time during the operation of the optical reading device 1, the timeout time is set to abort the decoding process if reaching the preset upper limit time.

Figure 13:
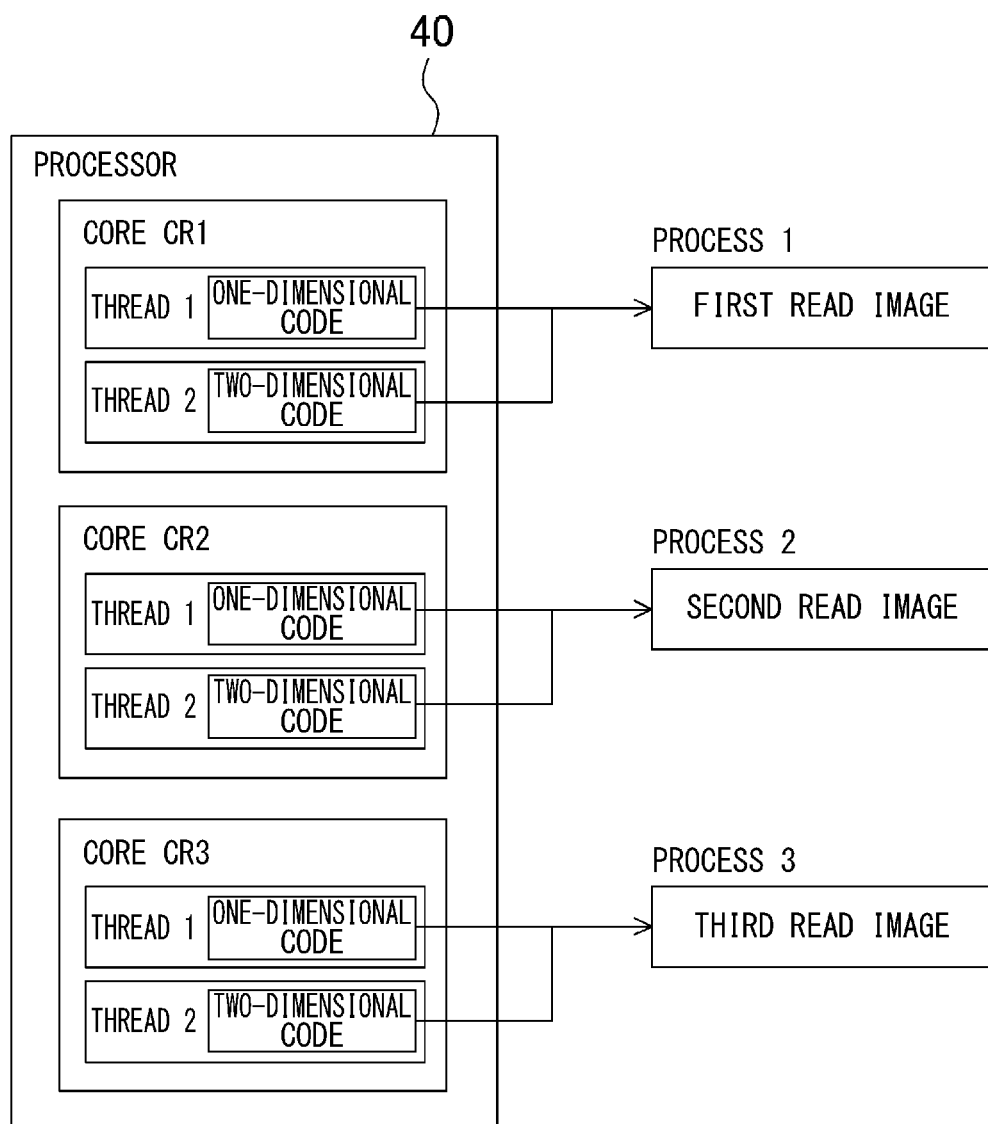
FIG. 13 is a conceptual diagram in a case where a plurality of read images are processed in parallel by a plurality of threads in a plurality of cores.

FIG. 13 is a conceptual diagram in a case where a plurality of read images (first to third read images) are processed in parallel by a plurality of threads (Threads 1 and 2) in the plurality of cores CR1 to CR3. As illustrated in this example, if the first read image includes a one-dimensional code and a two-dimensional code, a decoding process of the one-dimensional code is executed as Thread 1, and a decoding process of the two-dimensional code is executed as Thread 2 in the core CR1 that executes the decoding process on the first read image. Similarly, in the core CR2, a decoding process of a one-dimensional code included in the second read image is executed as Thread 1, and a decoding process of a two-dimensional code included in the second read image is executed as Thread 2. In addition, in the core CR3, a decoding process of a one-dimensional code included in the third read image is executed as Thread 1, and a decoding process of a two-dimensional code included in the third read image is executed as Thread 2. Even when the plurality of one-dimensional codes are attached or when the plurality of two-dimensional codes are attached, it is possible to instruct different cores to execute the decoding processes.

The number of threads in each of the cores CR1 to CR3 is not limited to two, and may be one or three or more. When the workpiece W has only one-dimensional code or only two-dimensional code, each of the cores CR1 to CR3 has one thread.

Figure 14:
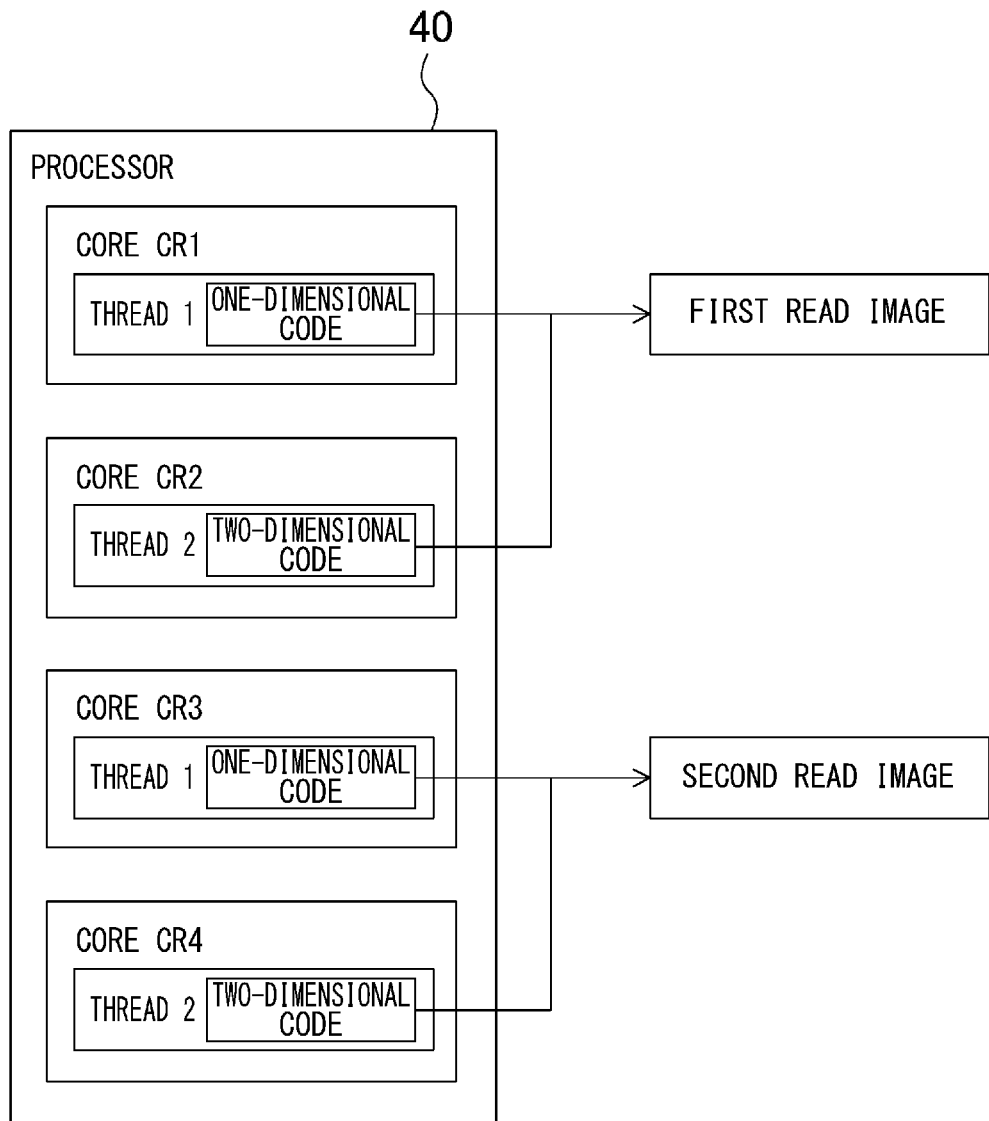
FIG. 14 is a conceptual diagram in a case where a plurality of read images are processed in parallel by one threads in a plurality of cores.

In addition, as illustrated in FIG. 14, the core CR0 can also give an instruction such that the decoding process of the one-dimensional code included in the first read image is executed by Thread 1 of the core CR1, and the decoding process of the two-dimensional code included in the first read image is executed by Thread 1 of the core CR2. Regarding the second read image, the core CR0 gives an instruction such that the decoding process of the one-dimensional code is executed by the core CR3 and the decoding process of the two-dimensional code is executed by the core CR4 in the same manner.

Figure 15:
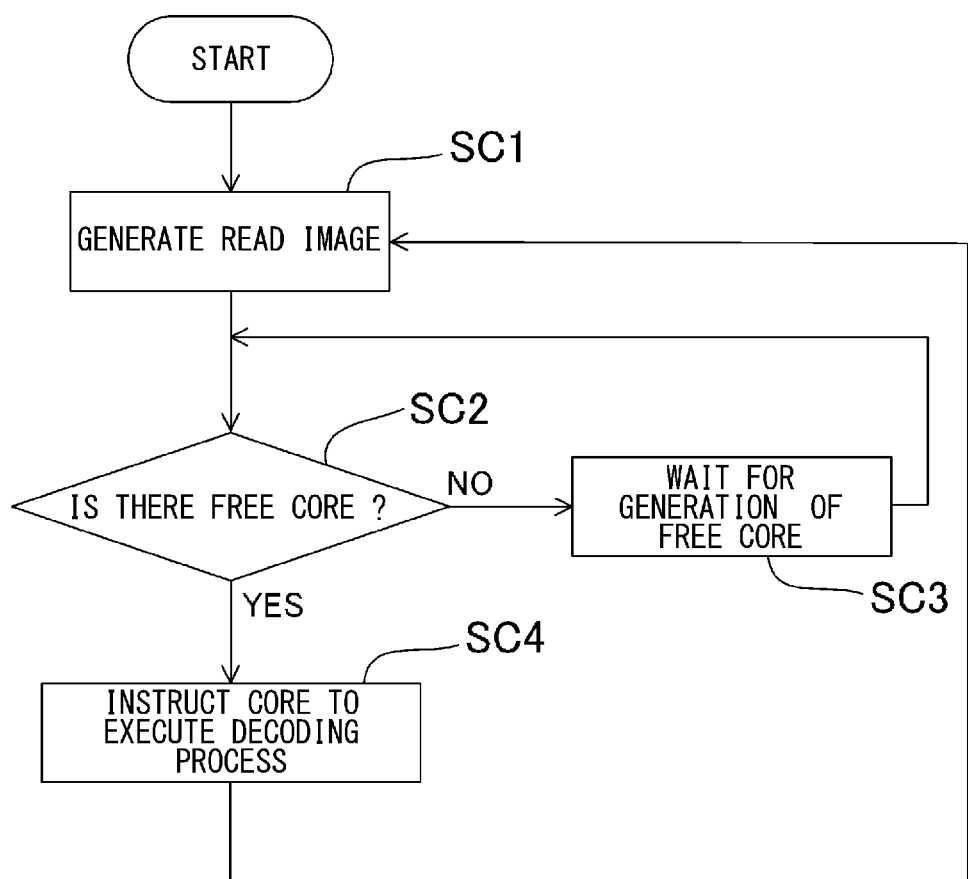
FIG. 15 is a flowchart in a case where a core that has completed the decoding process is instructed to perform the next decoding process.

FIG. 15 is a flowchart in a case where instructing a core that has completed the decoding process is instructed to execute the next decoding process, and the core CR0 determines the order of allocating the decoding processes to the respective cores CR1 to CR8 by first-in first-out (FIFO). This flowchart starts at the timing when the optical reading device 1 receives the reading start trigger signal, and ends at the timing when an operation stop operation is performed.

After the start, the imaging unit 5 captures images of the workpiece W and sequentially generates a plurality of read images in Step SC1. In Step SC2, the core CR0 determines whether the cores CR1 to CR8 are free. The term "free" is used when the decoding process is not performed, and the decoding process can be executed immediately. If it is determined as YES in Step SC2 and any of the cores CR1 to CR8 is free, the process proceeds to Step SC4. In Step SC4, the core CR0 instructs the free core to execute a decoding process, and thus, the decoding process is executed immediately by the free core, and then, the process returns to Step SC1. On the other hand, if it is determined as NO in Step SC2 and there is no free core among the cores CR1 to CR8, the process proceeds to Step SC3 and waits for generation of a free core for a predetermined time, then, proceeds to Step SC2, and proceeds to Step SC4 if there is a free core.

Figure 16:
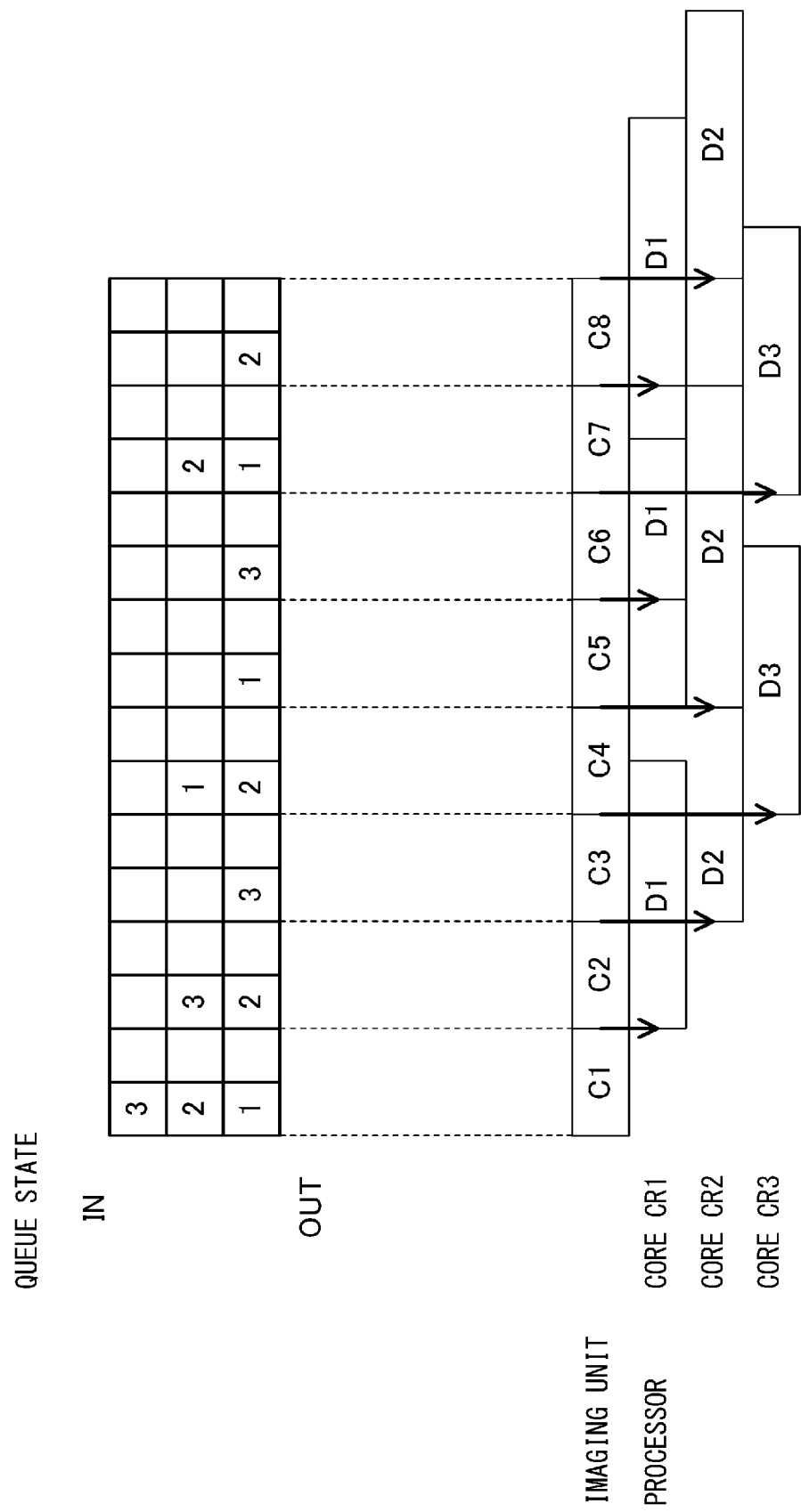
FIG. 16 is a view illustrating a queue state of each core that executes a decoding process and an instruction timing of a decoding process to each core.

A specific example of the case of determining the allocation of decoding processes by FIFO will be described with reference to FIG. 16. FIG. 16 describes a case where the cores CR1 to CR3 are provided. A number illustrated in the field of a queue state is a number of a free core, and the core CR1, the core CR2, and the core CR3 correspond to "1", "2", and "3", respectively.

At the beginning, the numbers 1 to 3 are loaded in the queue state since all the cores CR1 to CR3 are free. Thereafter, when the core CR1 is instructed to execute the decoding process of the read image of the first read image generation process C1, the number 1 disappears and the numbers 2 and 3 are loaded in the queue state. Therefore, the core CR0 can instruct the core CR2 to execute the decoding process of the read image of the second read image generation process C2. Similarly, the core CR0 can instruct the core CR3 to execute the decoding process of the read image of the third read image generation process C3.

When the fourth read image generation process C4 is completed, only the number 1 is loaded in the queue state, and thus, the core CR0 instructs the core CR1 to execute the decoding process of the read image of the fifth read image generation process C5. In this manner, the core CR0 determines the availability of the cores CR1 to CR3 and instructs the free core to execute the decoding process. Thus, it is easier to realize high-speed and fixed-interval reading as compared with the case where the decoding process is simply assigned to the cores CR1 to CR3 in order.

[Configuration of Tuning Execution Unit 24]

The tuning execution unit 24 illustrated in FIG. 3 is a unit that changes imaging conditions such as gain, the amount of light of the illumination unit 4, the exposure time, and image processing conditions in the processing unit 23. The image processing conditions in the processing unit 23 include a coefficient of an image processing filter (the strength of the filter) and switching of image processing filters, a combination of different types of image processing filters, and the like when there are a plurality of image processing filters. Appropriate imaging conditions and image processing conditions differ depending on the influence of external light on the workpiece W during conveyance, a color and a material of a surface to which the codes CD1 and CD2 are attached, and the like. Accordingly, the tuning execution unit 24 searches for more appropriate imaging conditions and image processing conditions, and sets the processing by the AF control unit 21, the imaging control unit 22, and the processing unit 23. As the image processing filters, various conventionally known filters can be used.

Figure 17:
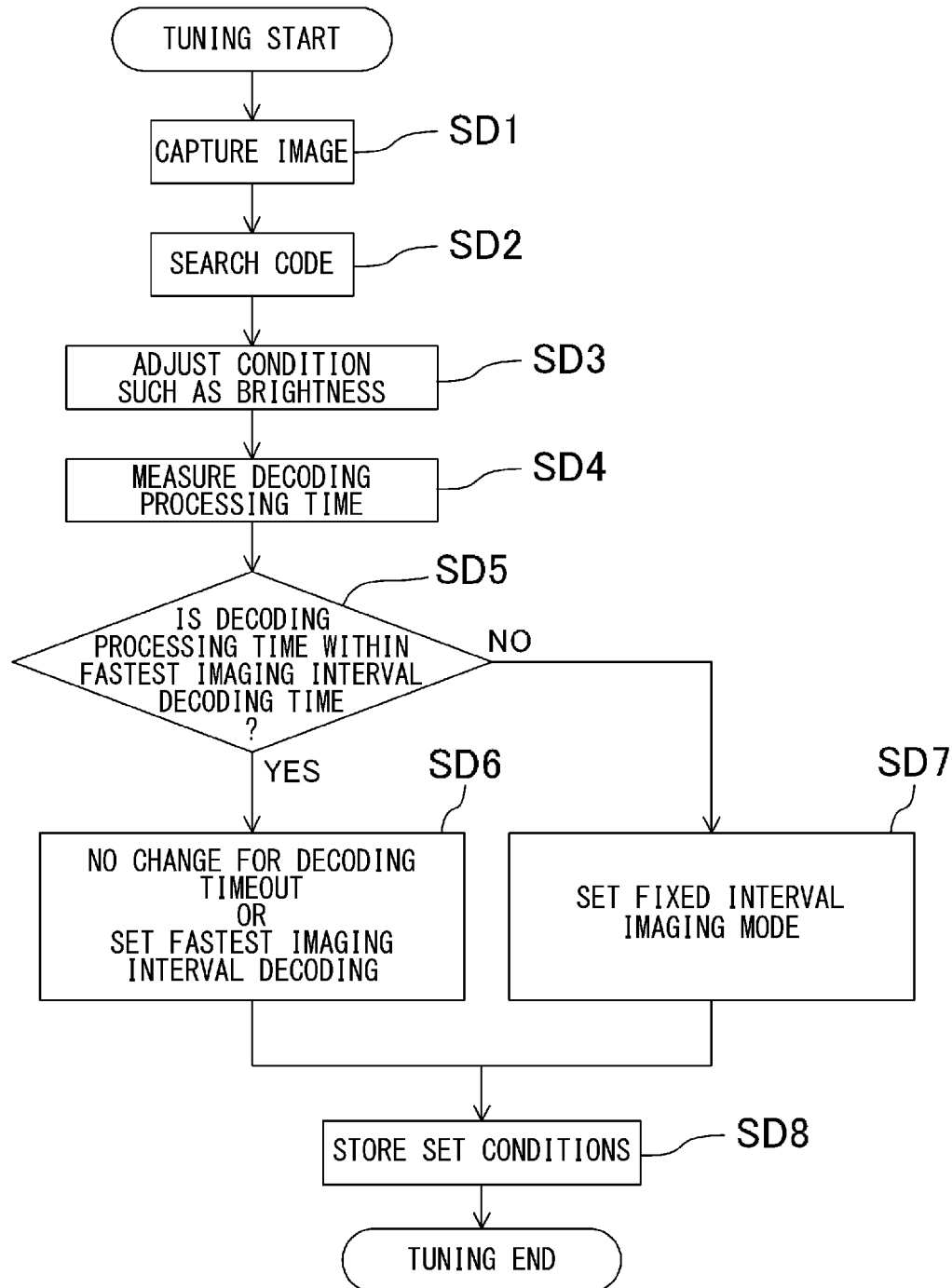
FIG. 17 is a flowchart illustrating a tuning procedure.

Before operating the optical reading device 1, the setting of the optical reading device 1 is made as an operation preparation stage. At the time of setting the optical reading device 1, various settings are made by transmitting various commands for setting from the computer 100 connected to the optical reading device 1 via the signal line 101a. During this setting, tuning is performed by the tuning execution unit 24. A specific example of the tuning will be described with reference to FIG. 17. After the start of tuning, the codes CD1 and CD2 attached to the workpiece W are imaged by the imaging unit 5 to generate a read image in Step SD1.

Further, the process proceeds to Step SD2, and each of the codes CD1 and CD2 included in the generated read image is searched and decoded by the processing unit 23, and the processing unit 23 analyzes the reading margin, which indicates the ease of reading the codes CD1 and CD2 that have been successfully decoded. Thereafter, the process proceeds to Step SD3, and the tuning execution unit 24 changes the imaging conditions and set the suitability of an image processing filter and the strength of the image processing filter to be applied so as to increase the reading margin analyzed by the processing unit 23.

In Step SD4, the time required for the decoding process is measured. In Step SD5, it is determined whether or not the decoding processing time is within a fastest imaging interval decoding time. The fastest imaging interval decoding time is the time (reference time) obtained by multiplying the time, obtained by adding the generation time and the transfer time of the read image obtained by the imaging unit 5, by the number of the cores CR1 to CR8. For example, when the generation time of the read image by the imaging unit 5 is A, the time (transfer time) required until the core CR0 stores the generated read image in the memory 31 and the cores CR1 to CR8 start reading is B, and the number of the cores CR1 to CR8 is C, the time obtained by the following formula is the fastest imaging interval decoding time.

Fastest imaging interval decoding time=(A+B)×C If it is determined as YES in Step SD5 and the decoding processing time measured in Step SD4 is within the fastest imaging interval decoding time, the process proceeds to Step SD6, and the decoding processing time measured in Step SD4 is set as an upper limit time of the decoding process. That is, the tuning execution unit 24 generates the read image including the code using the imaging unit 5 and executes the decoding process on the generated read image using the processing unit 23 to measure the time required for the decoding process at the time of setting the optical reading device 1, and automatically sets the upper limit time of the decoding process based on the measured time. Note that the upper limit time of the decoding process can be automatically set to be shorter than the fastest imaging interval decoding time.

On the other hand, if it is determined as NO in Step SD5 and the decoding processing time measured in Step SD4 exceeds the fastest imaging interval decoding time, the measured time is set as the upper limit time of the decoding process, and the process proceeds to Step SD7 to set a fixed interval imaging mode. The fixed interval imaging mode will be described later.

After passing through Steps SD6 and SD7, the process proceeds to Step SD8 and set conditions are stored. The set conditions can be stored in the form of a bank as illustrated in FIG. 8.

FIG. 18 is a timing chart of the fixed interval imaging mode. Although the core CR0 is omitted in this drawing, the decoding process is instructed by the core CR0. In addition, the example of providing the cores CR1 to CR3 is illustrated, but the number of cores does not matter.

The fixed interval imaging mode is a mode selected when the execution of burst imaging is not suitable as a result of the tuning described above. In the fixed interval imaging mode, the imaging unit 5 captures images intermittently as illustrated by C1 to C5 in FIG. 18. Thus, for example, the second read image generation process C2 is not started immediately even if the first read image generation process C1 is completed, and the second read image generation process C2 is started with a predetermined time interval. When the first read image generation process C1 is completed, the core CR0 instructs the core CR1 to execute the decoding process of the read image generated by the first read image generation process C1. The decoding process is also executed sequentially on the second and subsequent read images.

Since this fixed interval imaging mode is the mode applied when it is necessary to lengthen the time of the decoding process for one read image, an imaging interval becomes wider, but this interval is fixed at a predetermined time interval, and thus, the imaging interval is not changed so that the workpiece W can be prevented from passing during the imaging.

On the other hand, FIG. 19 is a timing chart when imaging is not performed at fixed intervals. This example is also the example of providing the cores CR1 to CR3. The read images generated by the first to third read image generation processes C1 to C3 are subjected to the decoding processes by the cores CR1 to CR3, respectively. Meanwhile, even if the fourth read image generation process C4 is completed, there may be no core capable of executing the decoding process on the read image generated by that process since the decoding processing time in the cores CR1 to CR3 is long. Accordingly, the read image generated by the fourth read image generation process C4 is subjected to the decoding process by the core CR1 after waiting for the completion of the decoding process of the core CR1. In this case, there is a time interval until the fifth read image generation process C5 is started since the completion of the fourth read image generation process C4.

Figure 20:
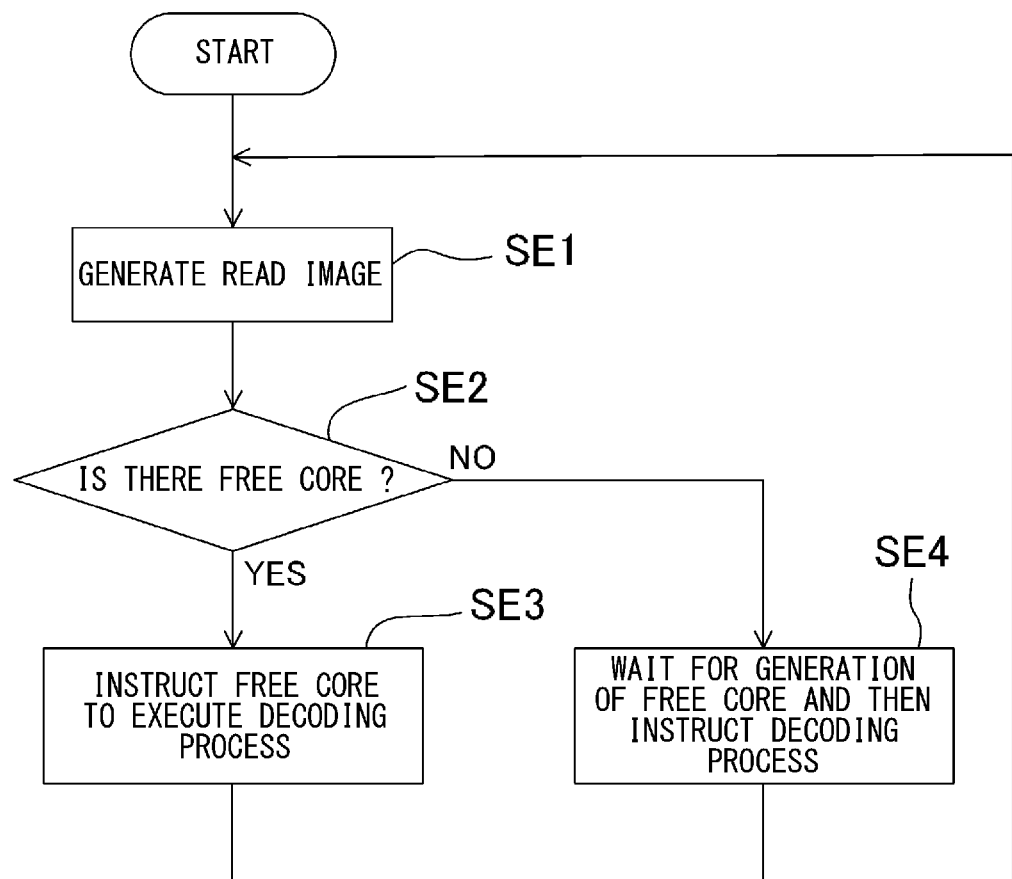
FIG. 20 is a flowchart illustrating a process procedure when waiting for a free core.

That is, as illustrated in the flowchart of FIG. 20, the optical reading device 1 starts at the timing when the reading start trigger signal is received, generates the read image in Step SE1 after the start, determines whether there is a free core in Step SE2, and then, proceeds to Step SE3 if there is a free core, and instructs the free core to execute the decoding process, or proceeds to Step SE4 if there is no free core, waits for the generation of a free core, and then, instructs the free core to execute the decoding process.

Figure 21:
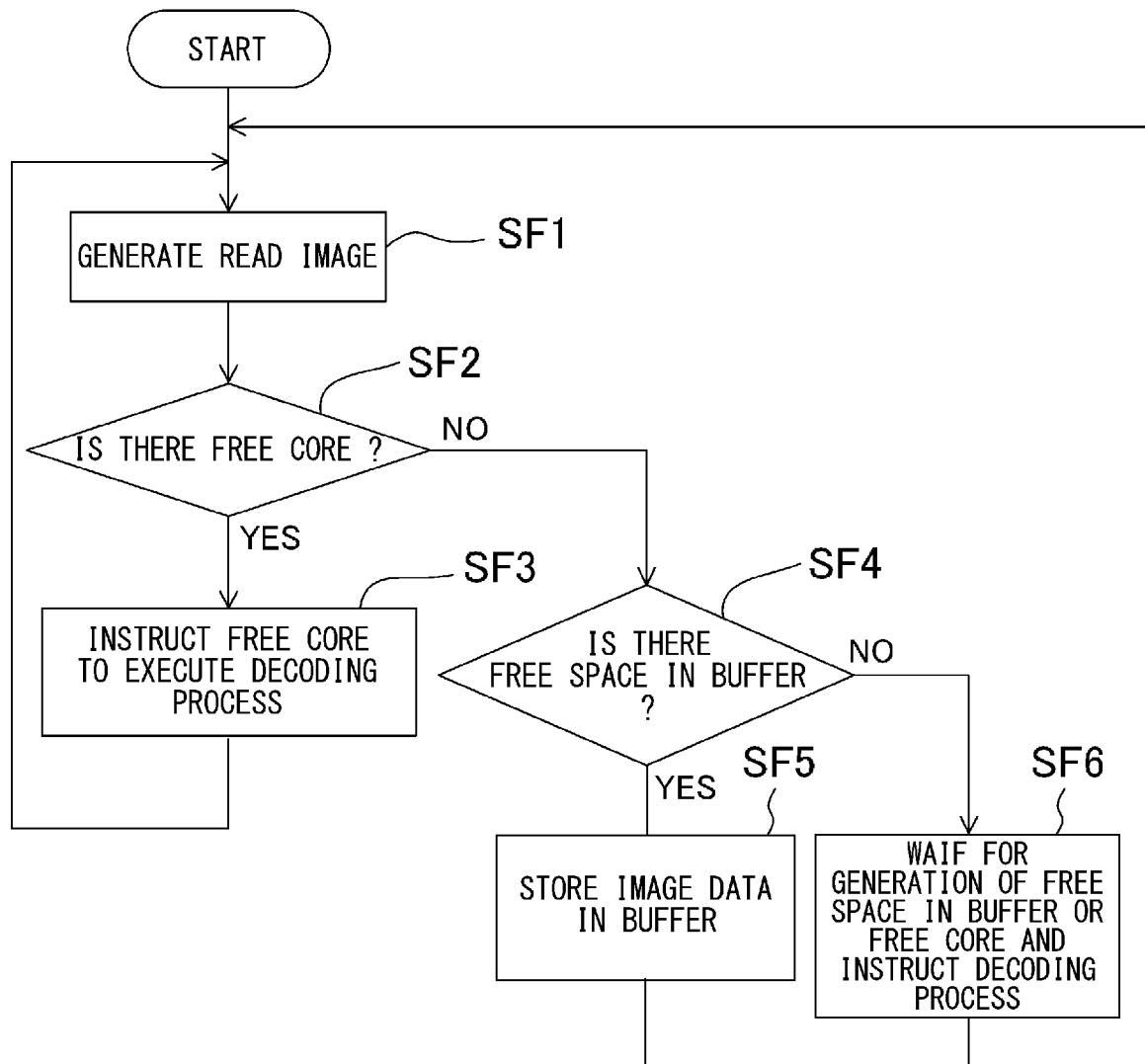
FIG. 21 is a flowchart illustrating a process procedure in a case where a buffer capable of storing image data is provided.

If there is no free core, the image data can be temporarily stored in the buffer. That is, as illustrated in the flowchart of FIG. 21, the optical reading device 1 starts at the timing when the reading start trigger signal is received, generates the read image in Step SF1 after the start, determines whether there is a free core in Step SF2, and then, proceeds to Step SF3 if there is a free core, and instructs the free core to execute the decoding process. On the other hand, if there is no free core, the process proceeds to Step SF4 to determine if there is a free space in the buffer, and then, the process proceeds to Step SF5 to temporarily store image data in the buffer if there is a free space in the buffer. If there is no free space in the buffer, the process proceeds to Step SF6 to wait for generation of a free space in the buffer or a free core. Then, if there is a free space in the buffer, the image data is stored there. If there is a free core, the core is instructed to execute the decoding process.

Since the capacity of the buffer is limited, it is conceivable that there may be some time between image generation processes. If the time between image generation processes becomes long, there is a case where the workpiece W passes during that time, and thus, the fixed interval imaging mode is preferable. In some cases, however, the operation mode as illustrated in the timing chart of FIG. 19 is also possible.

Figure 22:
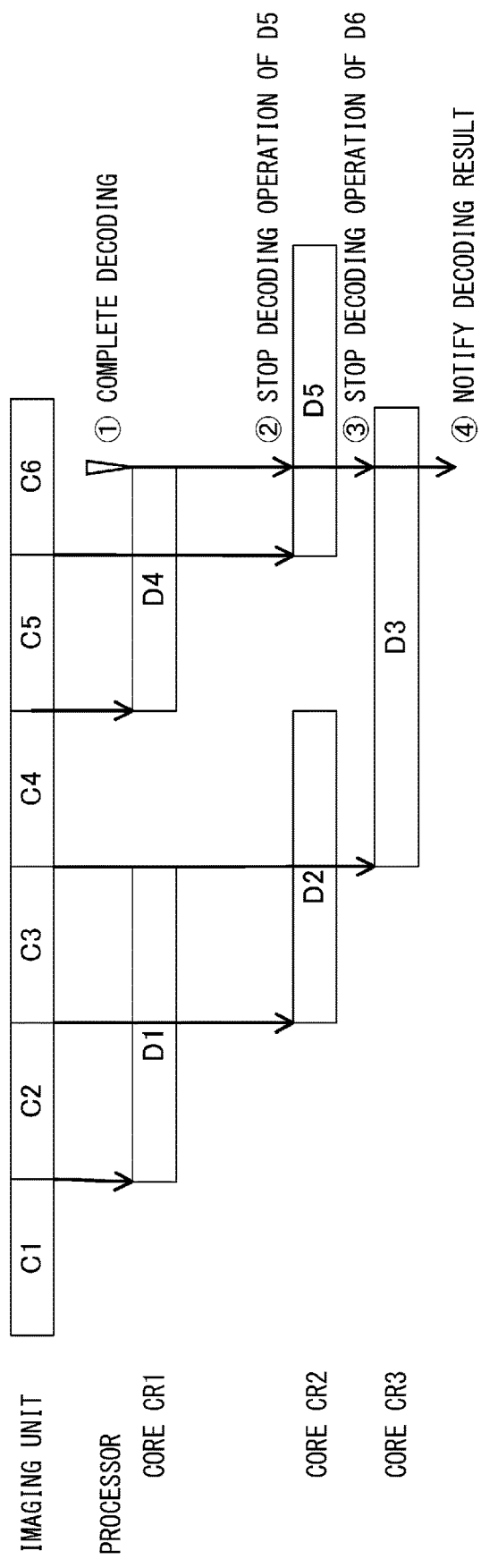
FIG. 22 is a timing chart illustrating an operation example after a decoding process is completed.

In addition, when a decoding process of any core is completed among the cores executing the decoding processes, all the decoding processes of the other cores can be also terminated. FIG. 22 illustrates a case where a decoding process D4 of the read image generated by the fourth read image generation process C4 is completed in the core CR1. When this decoding process is complete, a decoding process D5 of the read image generated by the fifth read image generation process C5 being executed by the core CR2 is stopped, and a decoding process D6 of the read image generated by the sixth read image generation process C6 is not executed. A decoding result obtained by the decoding process D4 is output at the same time as the decoding process D5 is stopped or after the decoding process D5 is stopped.

That is, when each of the plurality of cores CR1 to CR3 executes the decoding process of each of read images, the timing at which the decoding process is completed is usually different. For example, the decoding result is obtained when the decoding process is completed in the core CR1, there is no point in continuing the decoding process by the other cores CR2 and CR3 thereafter. In such a case, the decoding processes of the cores CR2 and CR3 can be stopped.

Figure 23:
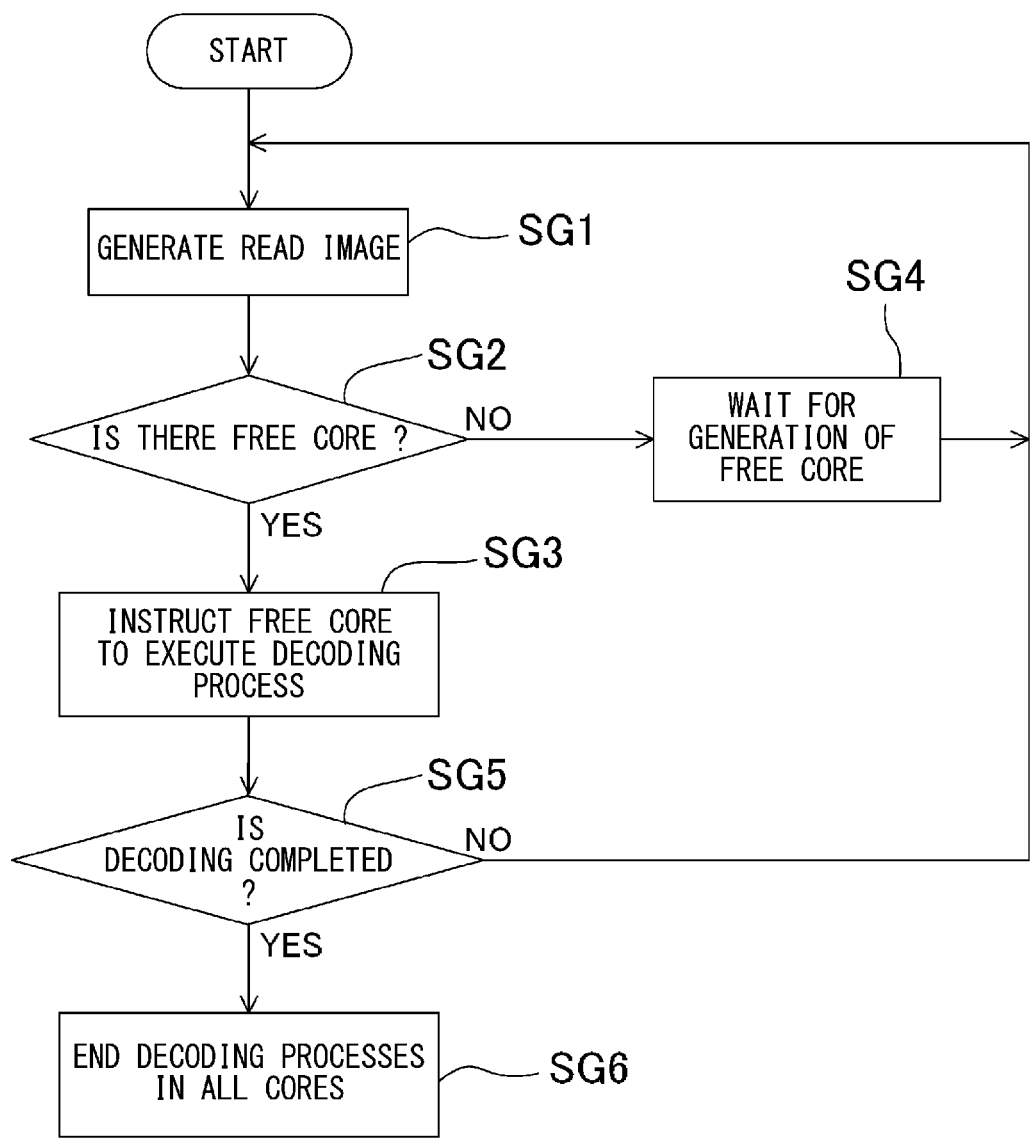
FIG. 23 is a flowchart illustrating an operation example after a decoding process is completed.

Specifically, a start timing of the flowchart of FIG. 23 is the timing at which the optical reading device 1 receives the reading start trigger signal, the read image is generated in Step SG1 after the start, whether there is a free core is determined in Step SG2, and then, the process proceeds to Step SG3 if there is a free core, and the free core is instructed to execute the decoding process. If there is no free core, the process proceeds to Step SG4 and waits for generation of a free core for a predetermined time, and then, returns to the start. In Step SG5, it is determined whether or not the decoding process has been completed in any of the cores. The process returns to the start. If the decoding process has not been completed in any of the cores, or proceeds to Step SG6 to end the decoding process in all the cores if the decoding process has been completed in any of the cores. As a result, a standby state can be set in preparation for reception of the next reading start trigger signal.

Figure 24:
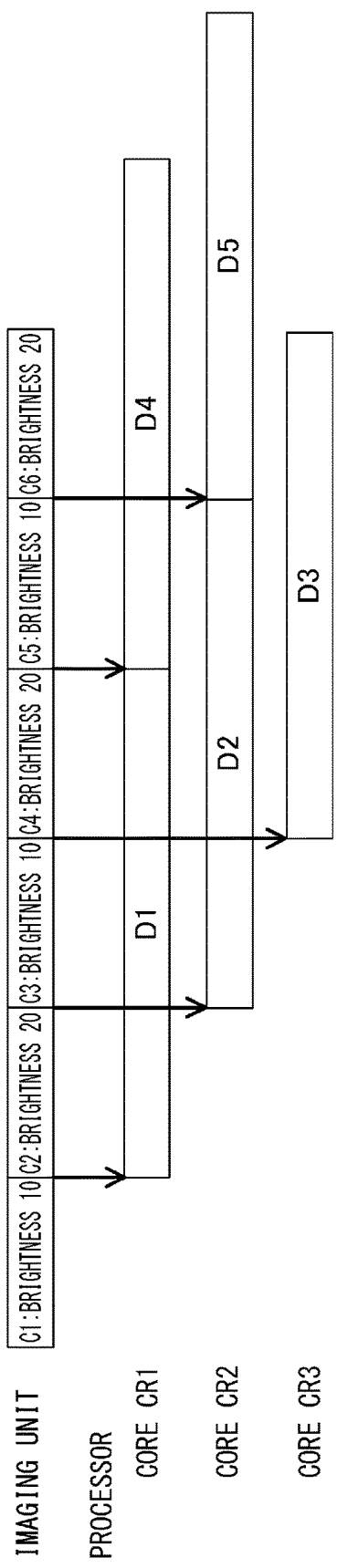
FIG. 24 is a timing chart in a case where a plurality of read images generated by changing brightness of an illumination unit are subjected to decoding processes by different cores.

FIG. 24 is a timing chart in a case where a plurality of read images generated by changing the brightness of the illumination unit 4 are subjected to decoding processes. The brightness of the illumination unit 4 is set to "10" in the first, third, and fifth read image generation processes C1, C3, and C5, and the brightness of the illumination unit 4 is set to "20" in the second, fourth, and sixth read image generation processes C2, C4, and C6. Regarding the brightness, "20" is brighter than "10". That is, the imaging unit 5 captures images of the workpiece W under different imaging conditions to generate a first read image (read image generated by the first, third, and fifth read image generation processes C1, C3, and C5) and a second read image (read image generated by the second, fourth, and sixth read image generation processes C2, C4, and C6).

The core CR0 subjects the read image generated by the first read image generation process C1 and the read image generated by the second read image generation process C2, generated under different imaging conditions, to decoding processes by the different cores CR1 and CR2, respectively. In addition, the core CR0 subjects the read image generated by the third read image generation process C3 and the read image generated by the fourth read image generation process C4, generated under different imaging conditions, to decoding processes by the different cores CR3 and CR1, respectively.

Figure 25:
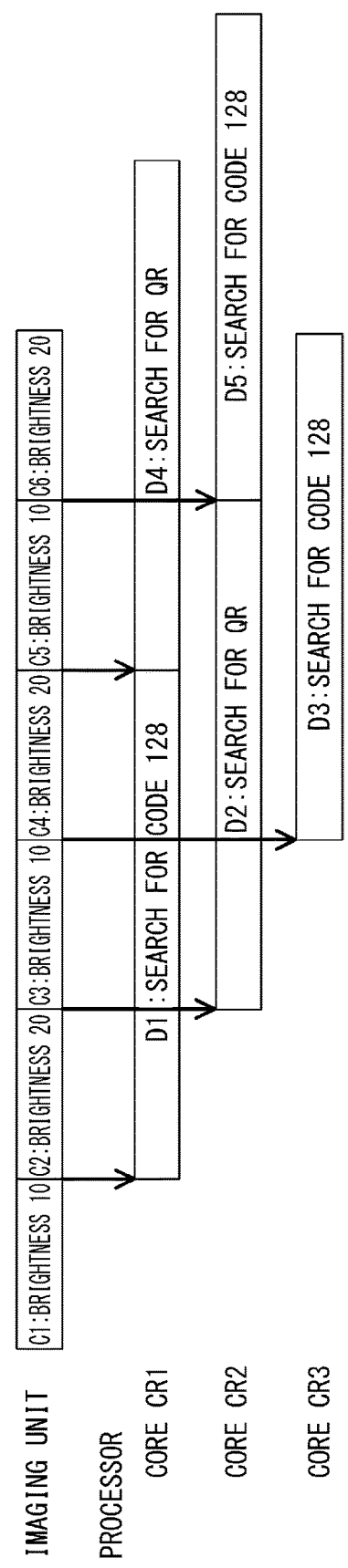
FIG. 25 is a timing chart in a case where different types of codes included in a plurality of read images generated by changing brightness of an illumination unit are subjected to decoding processes by different cores.

FIG. 25 is a timing chart in a case where different types of codes (one-dimensional code and two-dimensional code) included in a plurality of read images generated by changing brightness of the illumination unit 4 are subjected to decoding processes by different cores. In this example, it is assumed a case where, for example, a one-dimensional code (CODE128) and a two-dimensional code (QR) are attached to the workpiece W, and the two-dimensional code is farther than the one-dimensional code. In this case, the brightness of the illumination unit 4 is set to "10", and the first, third, and fifth read image generation processes C1, C3, and C5 are executed with the brightness suitable for capturing an image of a relatively close one-dimensional code. On the other hand, as the brightness suitable for capturing an image of a relatively distant two-dimensional code, the brightness of the illumination unit 4 is set to "20", and the second, fourth, and sixth read image generation processes C2, C4, and C6 are executed. At this time, the first, third, and fifth read image generation processes C1, C3, and C5 may be executed according to the imaging parameters of Bank 1 illustrated in FIG. 8, and the second, fourth, and sixth read image generation processes C2, C4, and C6 may be executed according to the imaging parameters of Bank 2.

The core CR0 subjects the read image generated by the first read image generation process C1 and the read image generated by the second read image generation process C2, generated with different imaging conditions, to decoding processes by the cores CR1 and CR2, respectively. The core CR1 executes the decoding process of the one-dimensional code, and the core CR2 executes the decoding process of the two-dimensional code. In addition, the core CR0 subjects the read image generated by the third read image generation process C3 and the read image generated by the fourth read image generation process C4, generated with different imaging conditions, to decoding processes by the cores CR3 and CR1, respectively. The core CR3 executes the decoding process of the one-dimensional code, and the core CR1 executes the decoding process of the two-dimensional code.

In addition, the imaging unit 5 can also capture images of the workpiece W under different decoding conditions to generate a first read image and a second read image similarly to the case where the imaging conditions are different. In this case as well, the core CR0 can instruct different cores to execute decoding processes of the first read image and the second read image generated under the different decoding conditions.

[Operation of Optical Reading Device 1]

Figure 26:
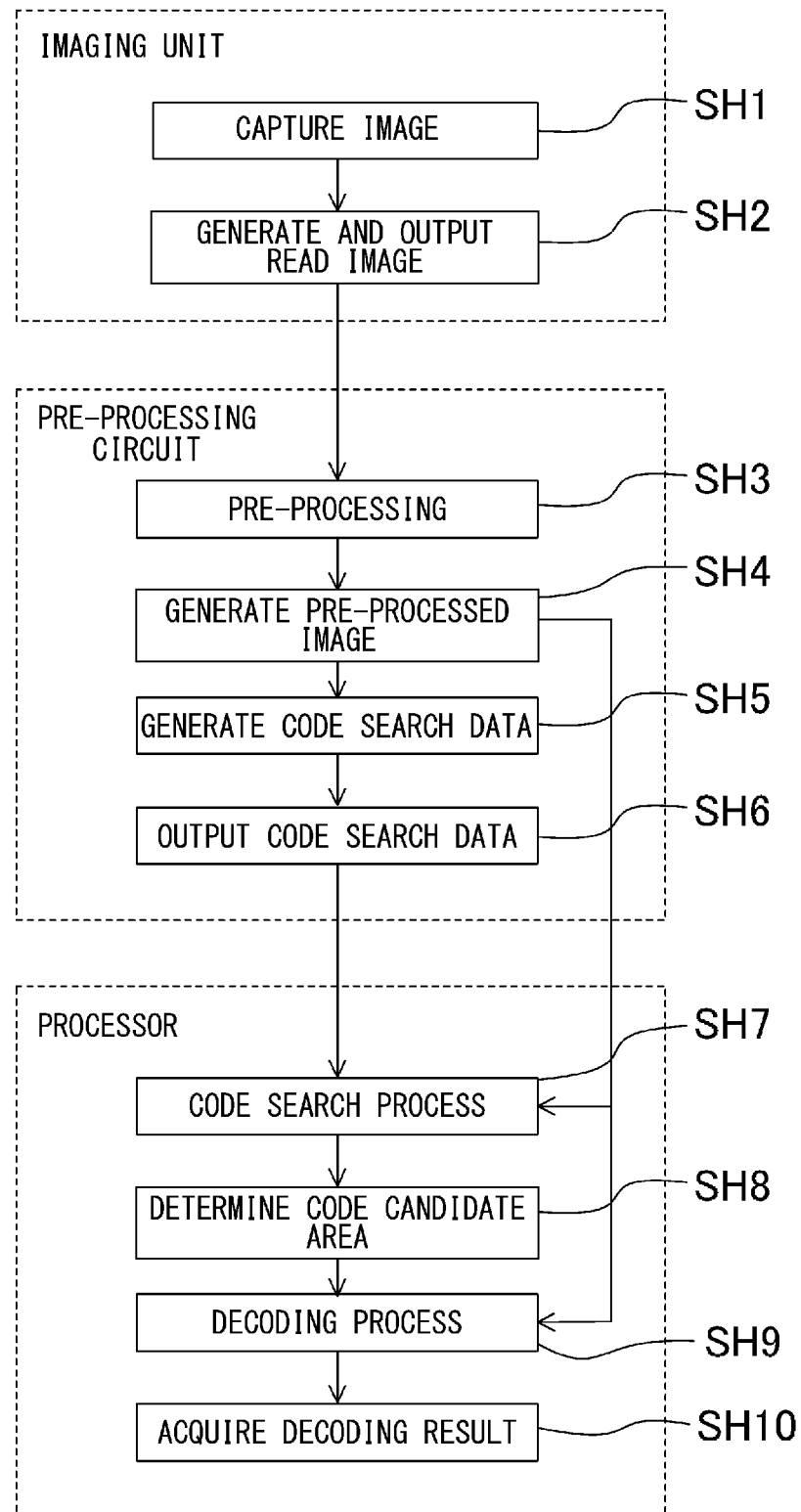
FIG. 26 is a flowchart illustrating processing during the operation time of the optical reading device.

FIG. 26 illustrates the processing during the operation time of the optical reading device 1. During the operation time of the optical reading device 1, Step SH1 is started when the reading start trigger signal is received. In Step SH1, the imaging unit 5 captures an image of the workpiece W. In Step SH2, a read image is generated from image data obtained by imaging in Step SH1 and output to the pre-processing circuit 30. At this time, the image data for each line is input to the pre-processing circuit 30. Note that, instead of the image data for each line, image data for a plurality of lines or the entire image data constituting one read image may be input to the pre-processing circuit 30.

In Step SH3, the pre-processing circuit 30 executes pre-processing such as a gradation conversion process and various image filtering processes on the image data, and a pre-processed image is generated in Step SH4. Thereafter, the process proceeds to Step SH5, and a characteristic amount indicating the likelihood of a code is calculated for each area in pre-processed image data based on a brightness value of each pixel in the pre-processed image data, and the brightness value according to the calculated characteristic amount is assigned to generate a heat map image (code search data) illustrated in FIGS. 10B and 10C. In this process, edge data generation, an edge data integration process, and the like are executed. After generating the code search data, the process proceeds to Step SH6 to output the code search data to the processor 40.

The processor 40 executes a code search process using the code search data in Step SH7. That is, when the code search data is the heat map image illustrated in FIGS. 10B and 10C, an area having a high brightness value corresponds to the code candidate area, and thus, the processor 40 searches for the area having the high brightness value in the heat map image.

In Step SH8, the code candidate area is determined. Thereafter, the process proceeds to Step SH9, and the core CR0 of the processor 40 instructs the cores CR1 to CR8 to execute decoding processes. After the decoding processes, a decoding result is acquired in Step SH10 and output to an external device.

[User Interface Image]

Figure 27:
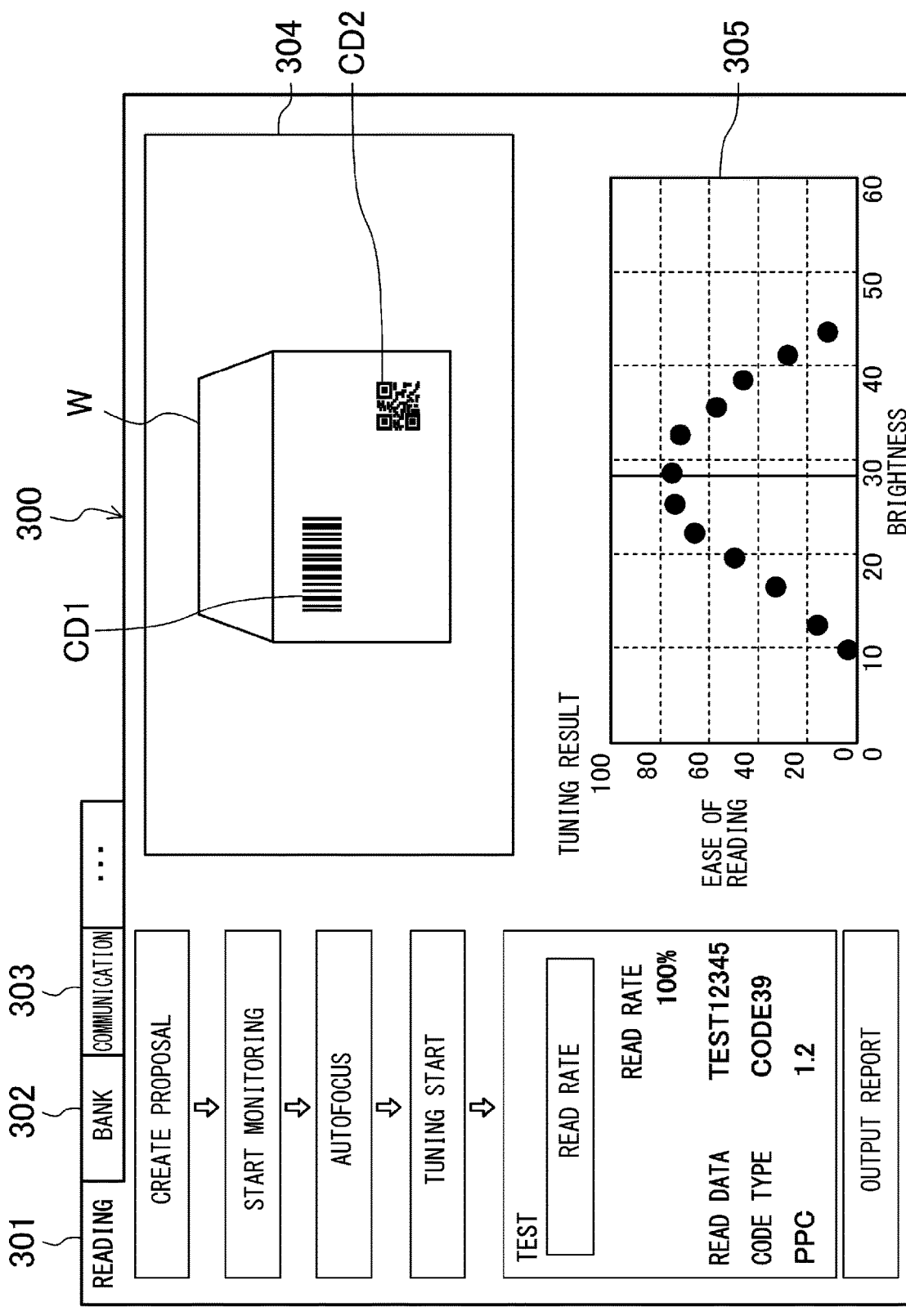
FIG. 27 is a view illustrating an example of a user interface image.

FIG. 27 is a view illustrating an example of the user interface image 300, and illustrates a case where the reading tab 301 is selected from among the plurality of tabs 301, 302, and 303. The user interface image 300 is provided with a read image display area 304 that displays a read image captured by the imaging unit 5 and a tuning result display area 305 that displays a tuning result. In the tuning result display area 305, for example, a graph illustrating the relationship between the ease of reading and brightness is displayed.

[Function and Effect of Embodiment]

As described above, according to the present embodiment, the characteristic amount indicating the likelihood of the code is calculated while capturing the image data for each line from the imaging unit 5, the code candidate area is determined based on this characteristic amount, and the decoding process of the determined area is executed. Thus, it is unnecessary to wait until scanning of the entire image ends to search for the code, and it is possible to perform the capturing of the image data from the imaging unit 5, the calculation of the characteristic amount, and the determination of the code candidate area in parallel. As a result, the output timing of the decoding result can be accelerated even if the size of the read image is large.

In addition, the decoding processes can be executed simultaneously on a plurality of cores among the cores CR1 to CR8. In other words, the plurality of cores can simultaneously execute the decoding processes on the read images instructed at different timings, and thus, the decoding process of the plurality of read images is speeded up while securing a sufficient decoding processing time for one read image and enabling stable reading. As a result, the reading result can be obtained at high speed, and the reading result can be output immediately after the generation of the read image.

The above-described embodiments are merely examples in all respects, and should not be construed as limiting. Further, all modifications and changes belonging to the equivalent range of the claims fall within the scope of the present aspect.

INDUSTRIAL AVAILABILITY

As described above, the optical reading device according to the present aspect can be used, for example, in the case of reading the code such as the bar code and the two-dimensional code attached to the workpiece.

What is claimed is:

1. A stationary optical reading device that reads a code attached to a workpiece being conveyed on a line, the optical reading device comprising:
  an illumination unit configured to emit light toward an area through which the workpiece passes;
  an imaging unit configured to receive the light emitted from the illumination unit and reflected from the area through which the workpiece passes and to generate a read image obtained by capturing an image of the area through which the workpiece passes;
  a processing unit including a first core that instructs a decoding process of the read image generated by the imaging unit and a plurality of second cores that acquire the read image instructed by the first core and execute a decoding process on the acquired read image; and
  an output unit that outputs decoding results generated by the plurality of second cores,
  wherein
  the first core instructs the second core, which is presumed to be capable of immediately executing the decoding process or executing a decoding process next to the decoding process being currently executed, to execute the decoding process, the plurality of the second cores are configured to be capable of simultaneously performing a decoding process on the read images instructed by the first core at different timings, and an upper limit time of the decoding process is set to be shorter than a reference time obtained by multiplying a time, obtained by adding a time for generating a read image by the imaging unit and a time required for the second core to read a read image stored in a memory by the first core, by a number of the second cores, in order for the imaging unit to continue successive generation of read images.

2. The optical reading device according to claim 1, wherein
the first core instructs the second cores, different from each other, to execute a decoding process of a first code and a second code when the read image includes the first code and the second code.

3. The optical reading device according to claim 2, wherein
when types of the first code and the second code included in the read image are different, the first core instructs the second cores, different from each other, to perform a decoding process of the first code and the second code.

4. The optical reading device according to claim 1, wherein
each of the second cores includes: a first decoding processing unit configured to execute a decoding process of a one-dimensional code; and a second decoding processing unit configured to execute a decoding process of a two-dimensional code, and
when the read image includes a one-dimensional code and a two-dimensional code, the second core executes the decoding process of the one-dimensional code by the first decoding processing unit, and executes the decoding process of the two-dimensional code by the second decoding processing unit.

5. The optical reading device according to claim 1, wherein
the imaging unit captures images of the workpiece under different imaging conditions to generate a first read image and a second read image, and
the first core instructs the second cores, different from each other, to execute a decoding process on the first read image and the second read image.

6. The optical reading device according to claim 5, further comprising:
a storage unit that stores a plurality of banks including imaging parameters that define the imaging conditions of the imaging unit; and
a receiving unit that receives selection of a first bank and a second bank performed by a user from among the plurality of banks stored in the storage unit,
wherein the imaging unit generates the first read image according to an imaging parameter of the first bank received by the receiving unit, and generates the second read image according to an imaging parameter of the second bank received by the receiving unit.

7. The optical reading device according to claim 1, wherein
the first core instructs the second core to execute a decoding process on the first read image and the second read image under different decoding conditions.

8. The optical reading device according to claim 1, wherein
when instructing the second cores, different from each other, to decode a plurality of read images generated by capturing an image of a single workpiece and detecting completion of the decoding process in any one of the second cores out of the second cores instructed to execute the decoding process, the first core stops the decoding process of the other second core.

9. A stationary optical reading device that reads a code attached to a workpiece being conveyed on a line, the optical reading device comprising:
an illumination unit configured to emit light toward an area through which the workpiece passes;
an imaging unit configured to receive the light emitted from the illumination unit and reflected from the area through which the workpiece passes and to generate a read image obtained by capturing an image of the area through which the workpiece passes;
a processing unit including a first core that instructs a decoding process of the read image generated by the imaging unit and a plurality of second cores that acquire the read image instructed by the first core and execute a decoding process on the acquired read image;
a tuning execution unit that acquires a read image including a code from the imaging unit when setting the optical reading device, causes the processing unit to execute a decoding process on the acquired read image to measure a time required for the decoding process, and automatically sets an upper limit time of the decoding process based on the measured time; and
an output unit that outputs decoding results generated by the plurality of second cores,
wherein
the first core instructs the second core, which is presumed to be capable of immediately executing the decoding process or executing a decoding process next to the decoding process being currently executed, to execute the decoding process,
the plurality of the second cores is configured to be capable of simultaneously performing a decoding process on the read images instructed by the first core at different timings,
the imaging unit is configured to be capable of continuously generating read images,
the tuning execution unit obtains a reference time, obtained by multiplying a time, obtained by adding a time for generating a read image by the imaging unit and a time required for the second core to read a read image stored in a memory by the first core, by a number of the second cores, and compares the reference time with the measured time,
when the measured time is equal to or shorter than the reference time, the tuning execution unit sets the measured time as the upper limit time of the decoding process, and
when the measured time exceeds the reference time, the tuning execution unit sets the measured time as the upper limit time of the decoding process, and a fixed interval imaging mode of increasing a generation interval of the read image by the imaging unit as compared with a generation interval in a case where the measured time is equal to or shorter than the reference time is executed.

* * * * *